United States Patent [19]

Spear, Jr. et al.

[11] Patent Number: 5,858,567
[45] Date of Patent: Jan. 12, 1999

[54] FUEL CELLS EMPLOYING INTEGRATED FLUID MANAGEMENT PLATELET TECHNOLOGY

[75] Inventors: Reginald G. Spear, Jr., Sacramento; H. Harry Mueggenberg, Carmichael; Rex Hodge, Sacramento, all of Calif.

[73] Assignee: H Power Corporation, Belleville, N.J.

[21] Appl. No.: 612,613

[22] Filed: Mar. 8, 1996

Related U.S. Application Data

[63] Continuation of Ser. No. 322,823, Oct. 12, 1994, abandoned.

[51] Int. Cl.[6] .................................................... H01M 8/04
[52] U.S. Cl. ................................ 429/12; 429/26; 429/34; 429/38
[58] Field of Search ................................ 429/12, 26, 30, 429/33, 34, 35, 38, 39, 210, 129, 247

[56] References Cited

U.S. PATENT DOCUMENTS

| | | | |
|---|---|---|---|
| 3,468,712 | 9/1969 | Gillespie . | |
| 3,489,614 | 1/1970 | Tomter . | |
| 3,530,005 | 9/1970 | Leonard . | |
| 3,634,139 | 1/1972 | Reiser .................................. | 136/86 R |
| 3,746,578 | 7/1973 | Warszawski et al. . | |
| 3,755,000 | 8/1973 | Demange ............................ | 136/86 D |
| 3,814,631 | 6/1974 | Warszawski et al. . | |
| 3,901,731 | 8/1975 | Warszawski et al. ................. | 136/86 R |
| 4,048,385 | 9/1977 | Regnaut .................................... | 429/34 |
| 4,074,020 | 2/1978 | Regnaut .................................... | 429/34 |
| 4,124,478 | 11/1978 | Tsien et al. ............................. | 204/255 |
| 4,210,512 | 7/1980 | Lawrence et al. ...................... | 204/257 |
| 4,403,018 | 9/1983 | Alfenaar et al. ......................... | 429/34 |
| 4,444,851 | 4/1984 | Maru ........................................ | 429/26 |
| 4,590,134 | 5/1986 | Warszawski et al. .................... | 429/35 |
| 4,590,135 | 5/1986 | Warszawski et al. .................... | 429/38 |
| 4,604,332 | 8/1986 | Warszawski et al. .................... | 429/38 |
| 4,640,876 | 2/1987 | Warzawski et al. ..................... | 429/37 |
| 4,687,607 | 8/1987 | Shigeta et al. ........................... | 264/29 |
| 4,718,997 | 1/1988 | Grimes et al. .......................... | 204/228 |
| 4,743,519 | 5/1988 | Kaji ......................................... | 429/36 |
| 4,758,481 | 7/1988 | Fauvel ..................................... | 429/39 |
| 4,778,736 | 10/1988 | Kaji et al. ................................ | 429/38 |
| 4,869,800 | 9/1989 | Hofmann et al. ...................... | 204/253 |
| 4,898,699 | 2/1990 | Hofmann et al. ........................ | 264/43 |
| 5,108,849 | 4/1992 | Watkins et al. .......................... | 429/30 |
| 5,116,695 | 5/1992 | Rao et al. ................................. | 429/12 |
| 5,116,696 | 5/1992 | Barp ........................................ | 429/26 |
| 5,132,174 | 7/1992 | Romanowski et al. ................... | 429/26 |
| 5,192,627 | 3/1993 | Perry, Jr. et al. ..................... | 429/34 X |
| 5,230,966 | 7/1993 | Voss et al. ................................ | 429/26 |
| 5,252,410 | 10/1993 | Wilkinson et al. ....................... | 429/33 |
| 5,300,370 | 4/1994 | Washington et al. .................... | 429/34 |
| 5,316,869 | 5/1994 | Perry, Jr. et al. .................... | 429/26 X |
| 5,356,731 | 10/1994 | Sitters et al. ............................. | 429/45 |
| 5,382,478 | 1/1995 | Chow et al. .............................. | 429/26 |
| 5,432,021 | 7/1995 | Wilkinson et al. ....................... | 429/17 |
| 5,527,363 | 6/1996 | Wilkinson et al. .................... | 29/623.1 |

*Primary Examiner*—Anthony Skapars
*Attorney, Agent, or Firm*—Heller Ehrman White & McAuliffe; Jacques M. Dulin

[57] ABSTRACT

Fuel cell stacks comprising stacked separator/membrane electrode assembly cells in which the separators comprise a series of stacked thin sheet platelets having individually configured serpentine micro-channel reactant gas humidification, active area and cooling fields therein. The individual platelets are stacked with coordinate features precisely aligned in contact with adjacent platelets and bonded to form a monolithic separator. Post bonding processing includes passivation, such as nitriding. Preferred platelet material is 4–25 mil Ti in which the features, serpentine channels, tabs, lands, vias, manifolds and holes, are formed by chemical or laser etching, cutting, pressing or embossing, with combinations of depth and through-etching being preferred. The platelet manufacturing process is continuous and fast. By employing CAD based platelet design and photolithography, rapid change in feature design to accommodate a wide range of thermal management and humidification techniques. 100 cell $H_2$—$O_2$/Air PEM fuel cell stacks of this IFMT platelet design will exhibit outputs on the order of 0.75 kW/kg, some 3–6 times greater than current graphite plate PEM stacks.

20 Claims, 19 Drawing Sheets

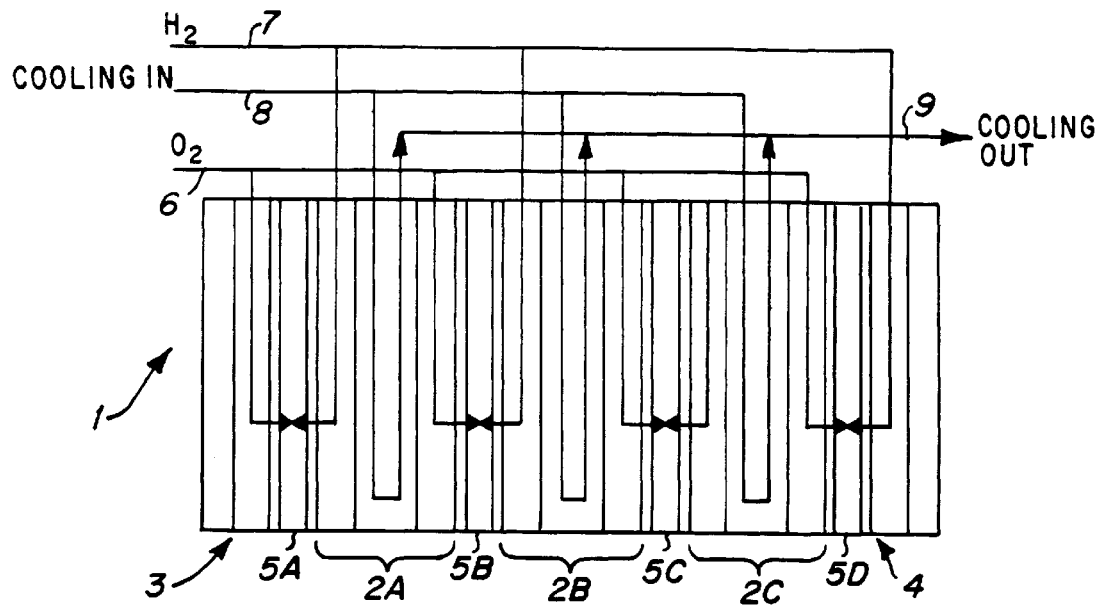
FUEL CELL STACK (SIMPLIFIED) *Fig. 1*
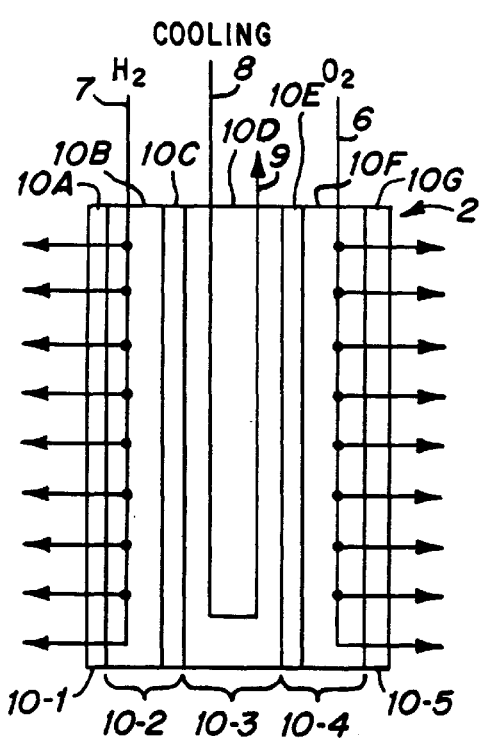
NO HUMIDIFICATION
*Fig. 2A*
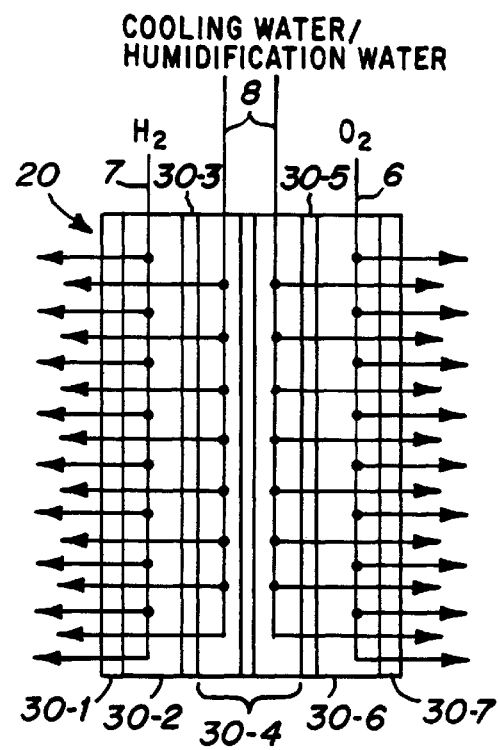
COMBINED COOLING & HUMIDIFICATION CHANNELS
*Fig. 2B*

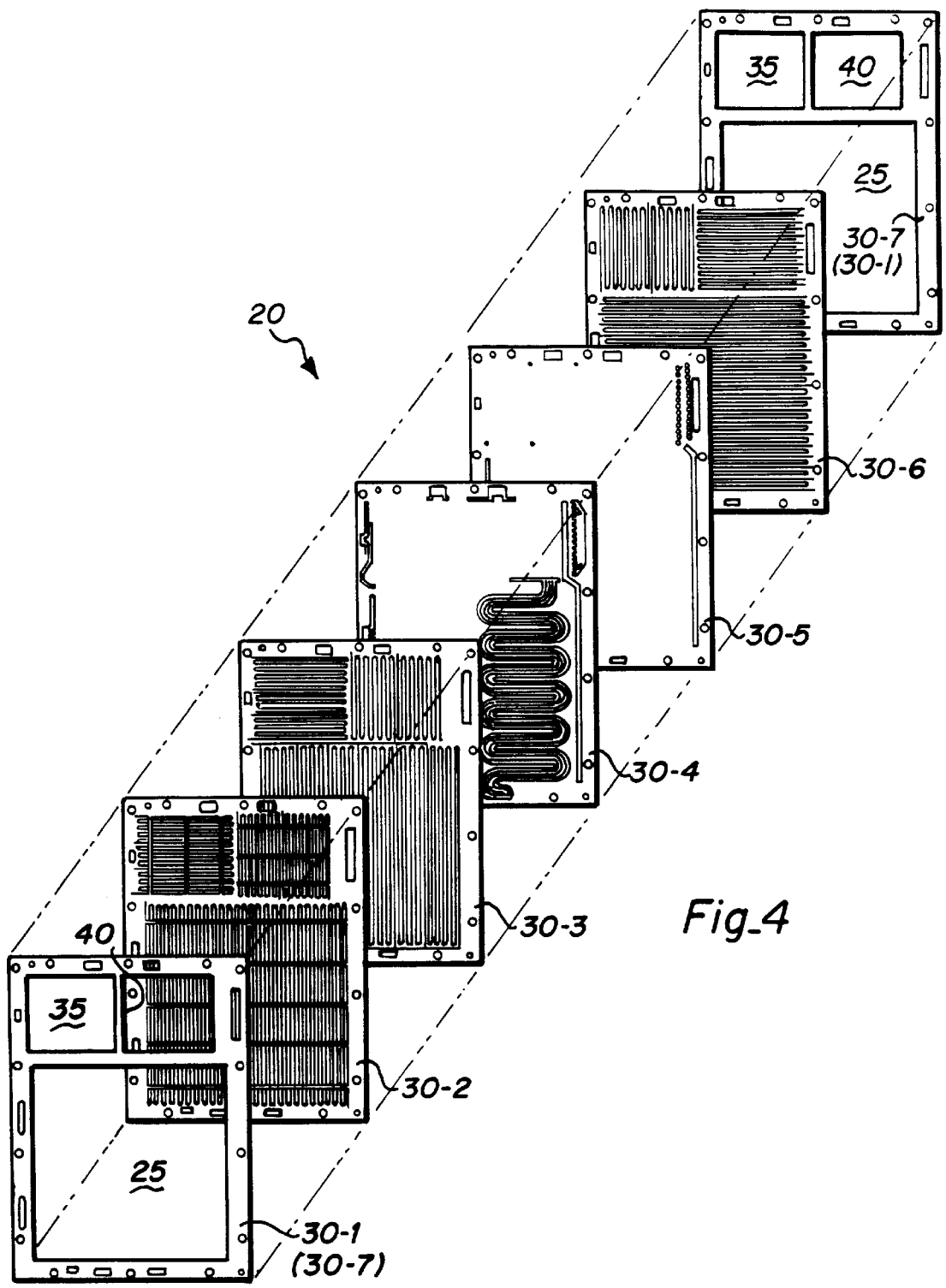
Fig_4

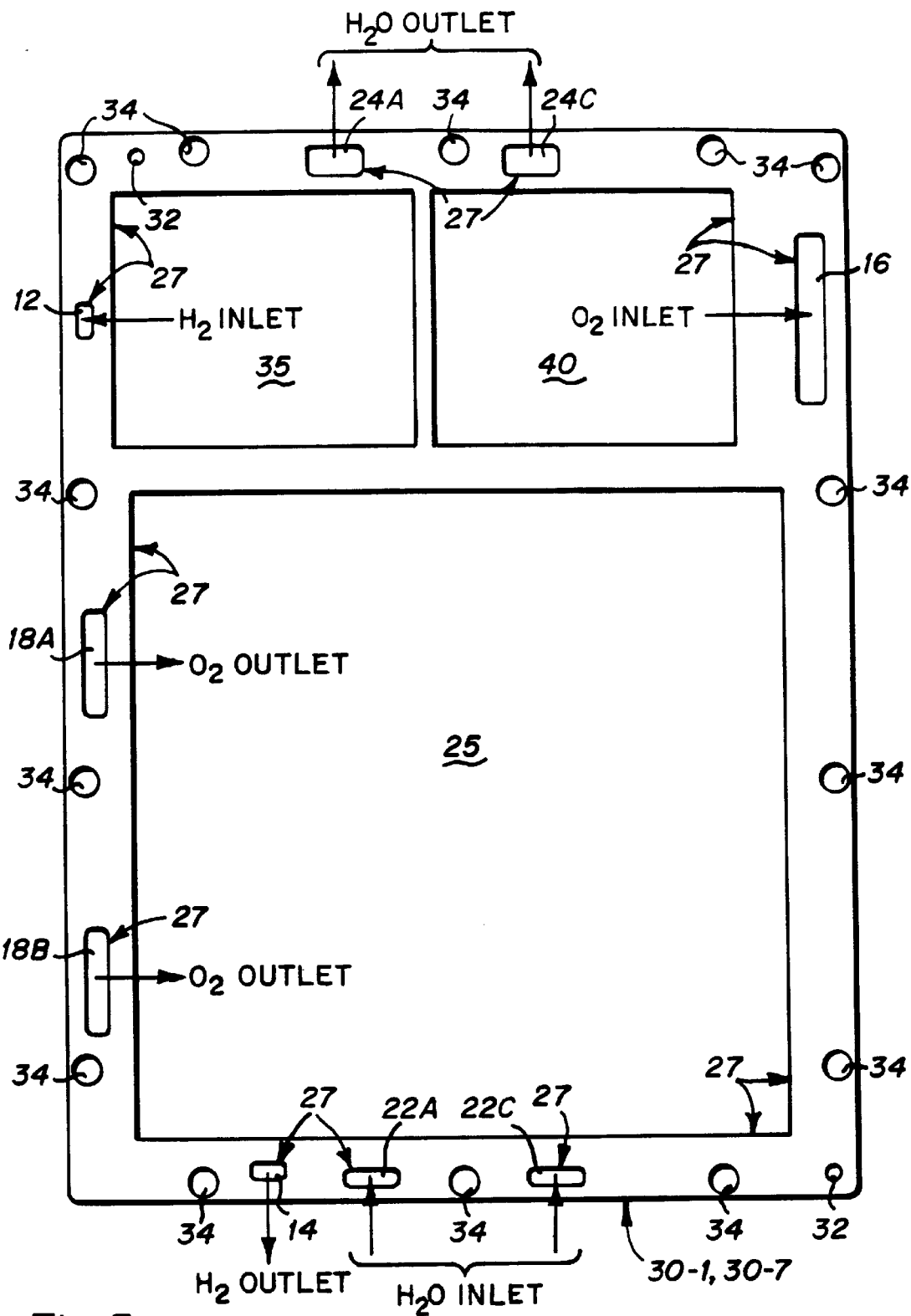
Fig_5

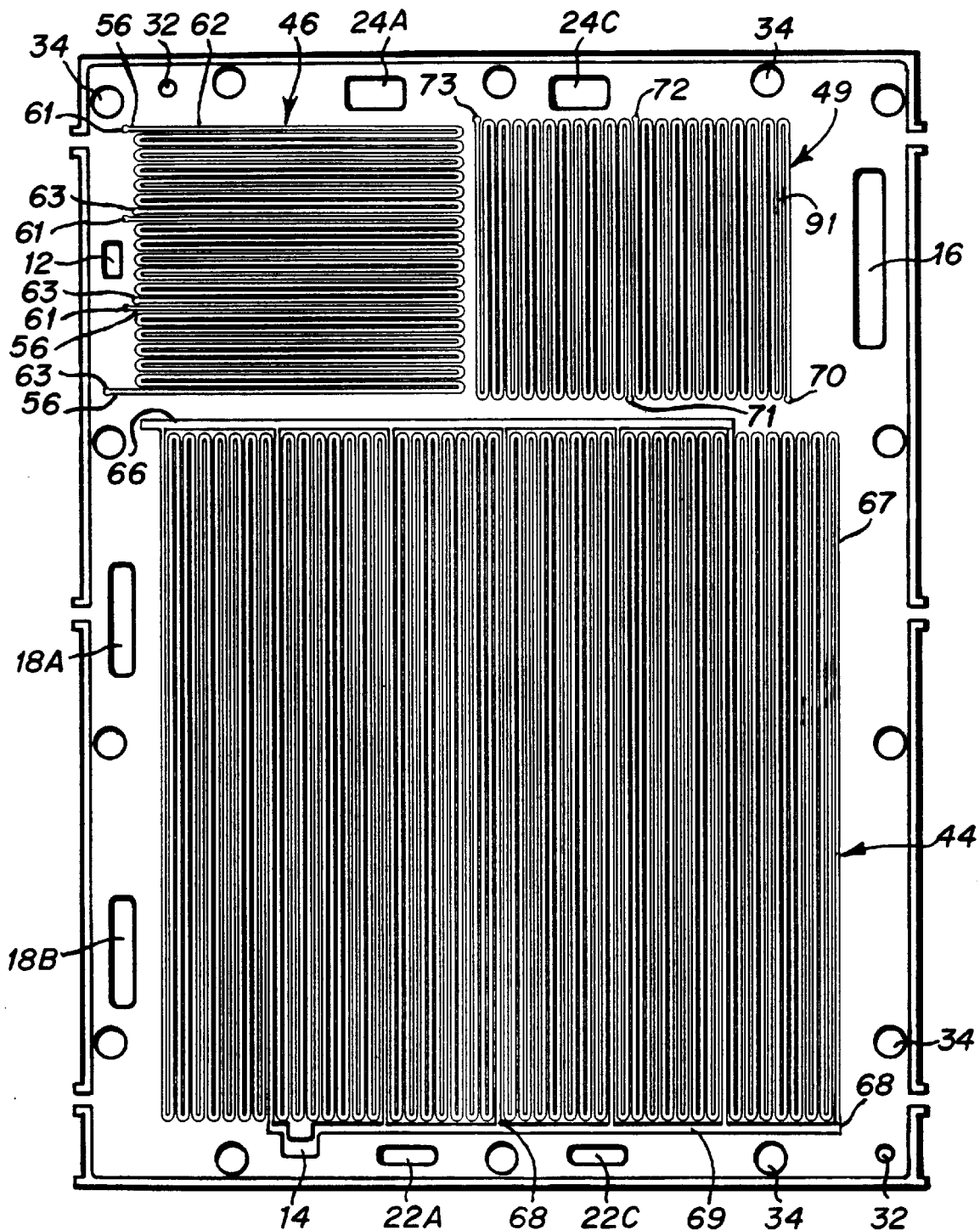
Fig_7A

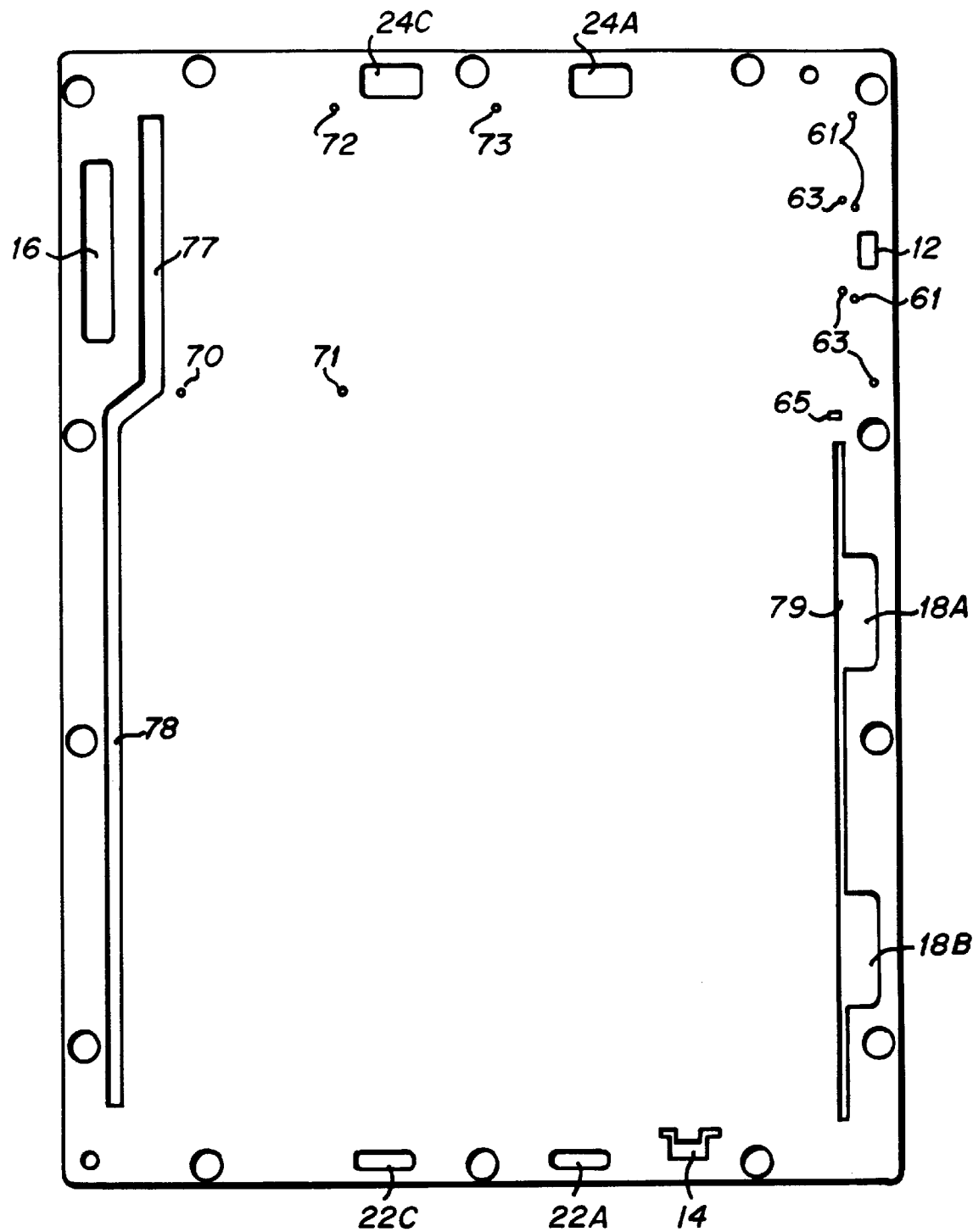
Fig_7B

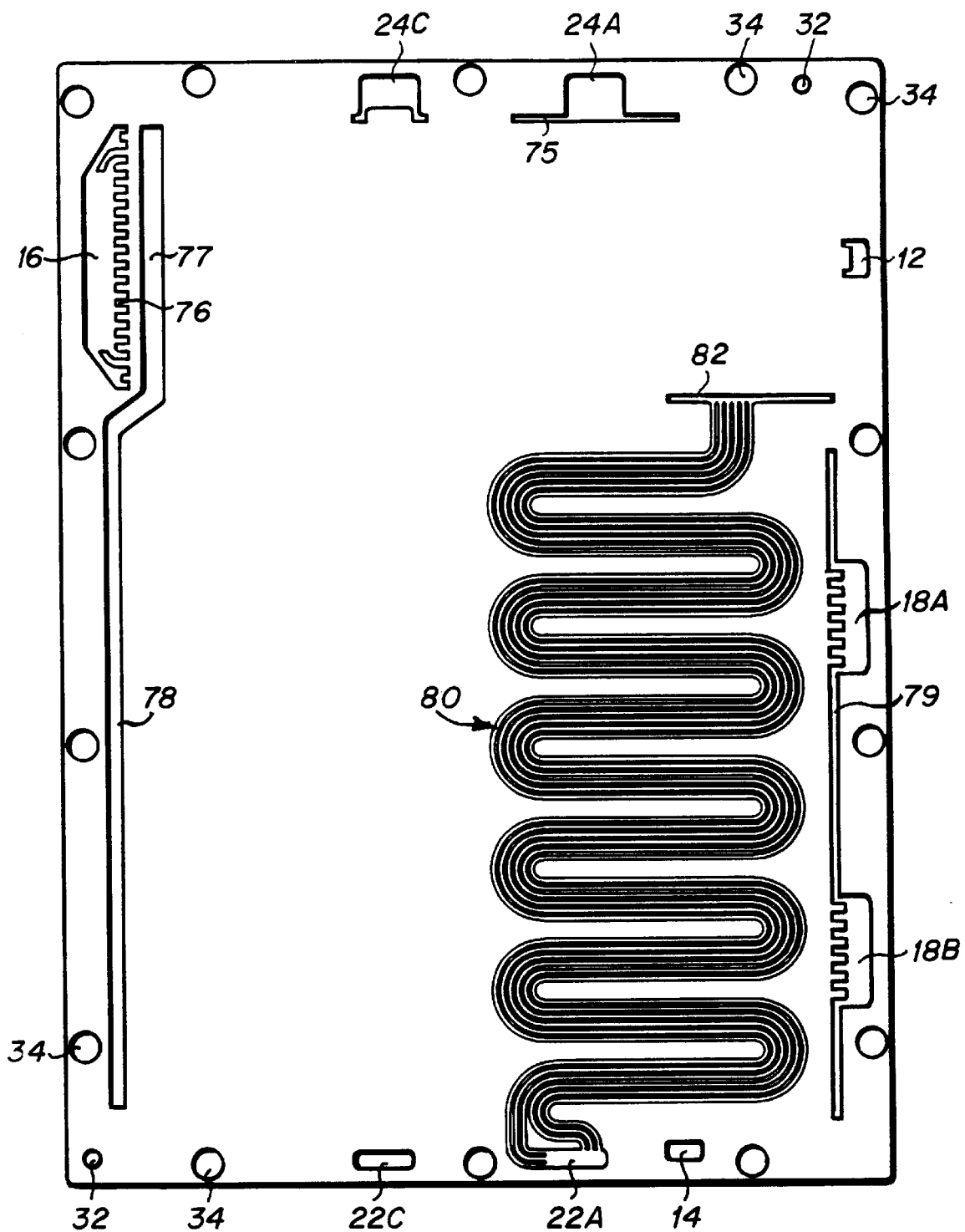
Fig_8B

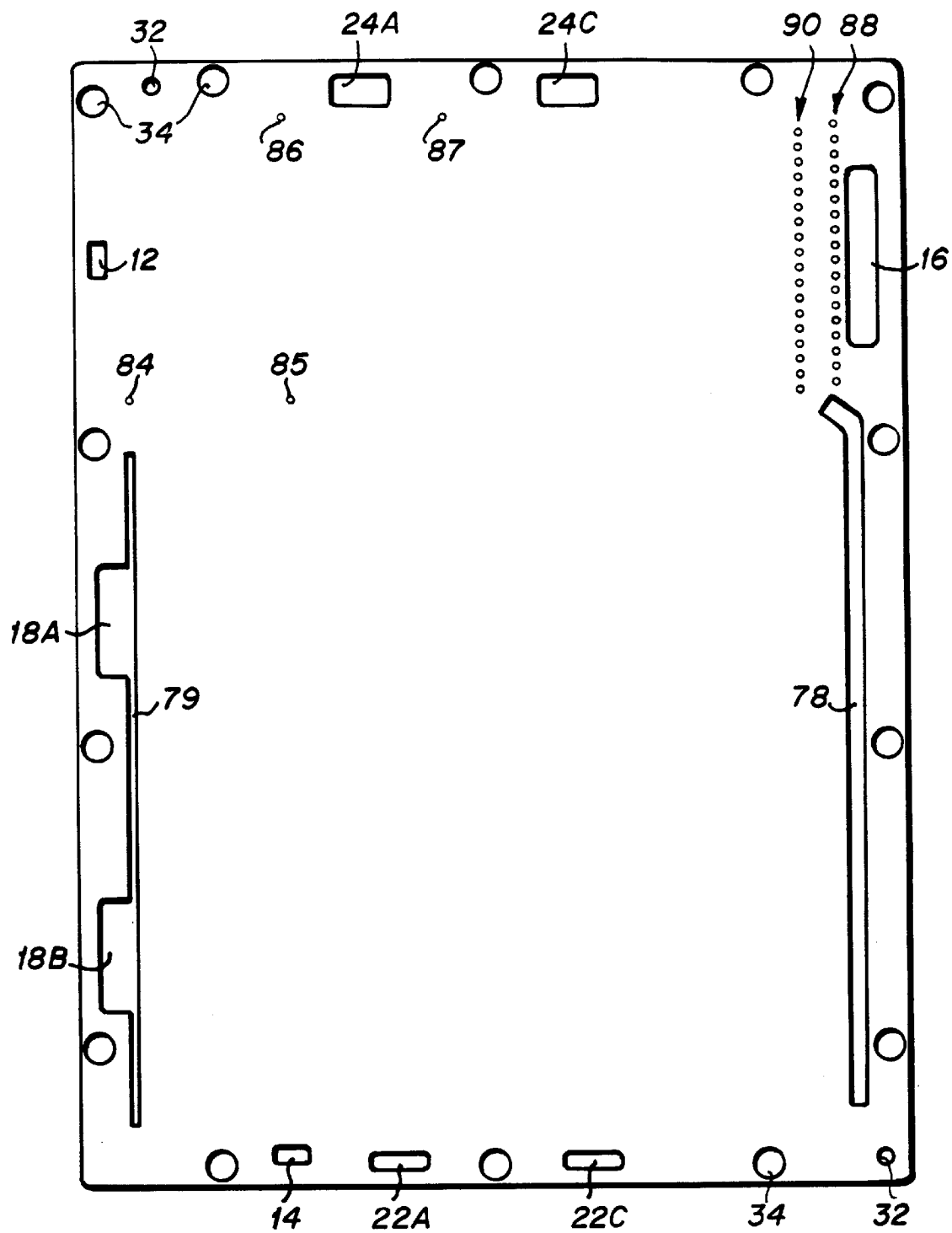
Fig_9A

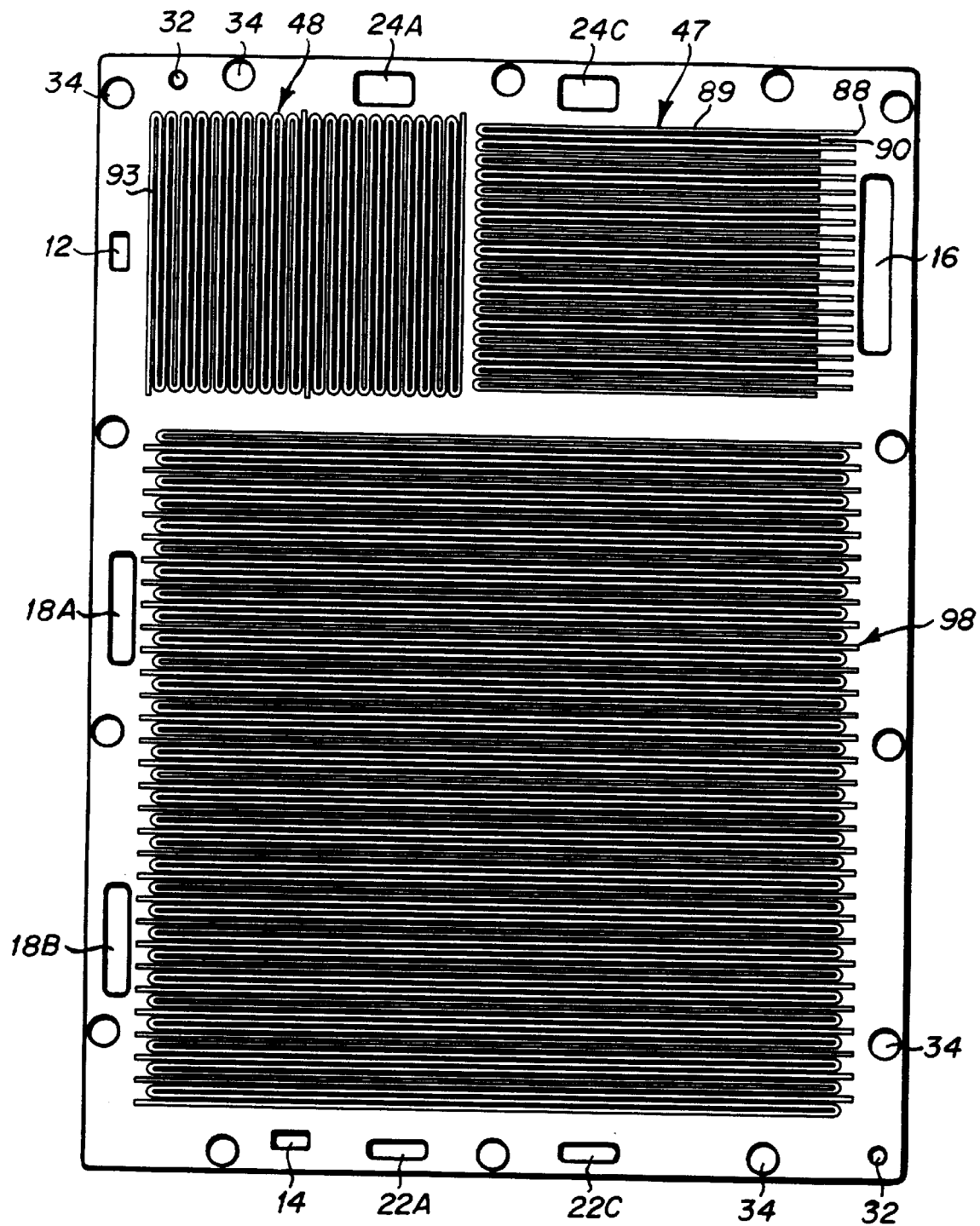
Fig_10A

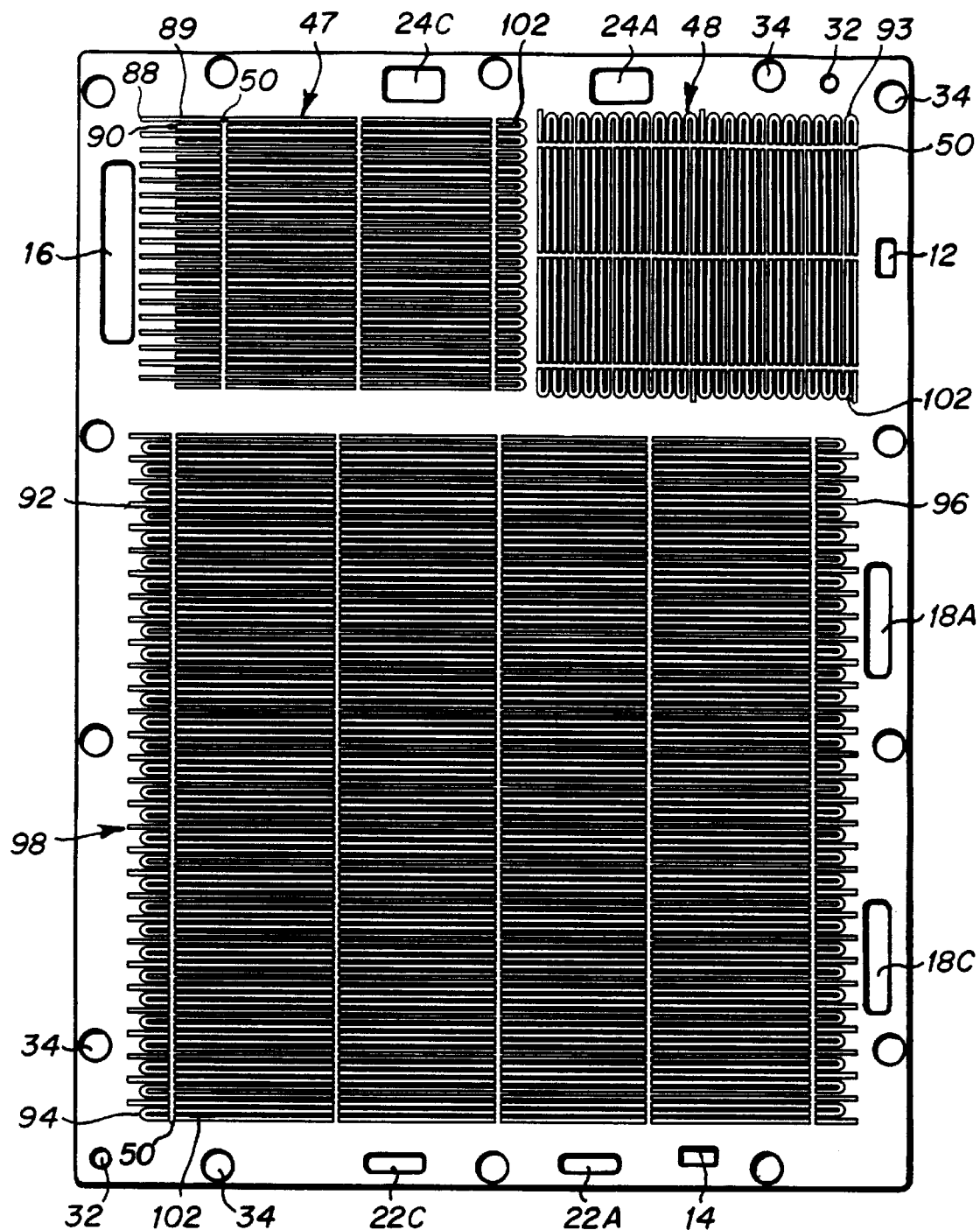
Fig_10B

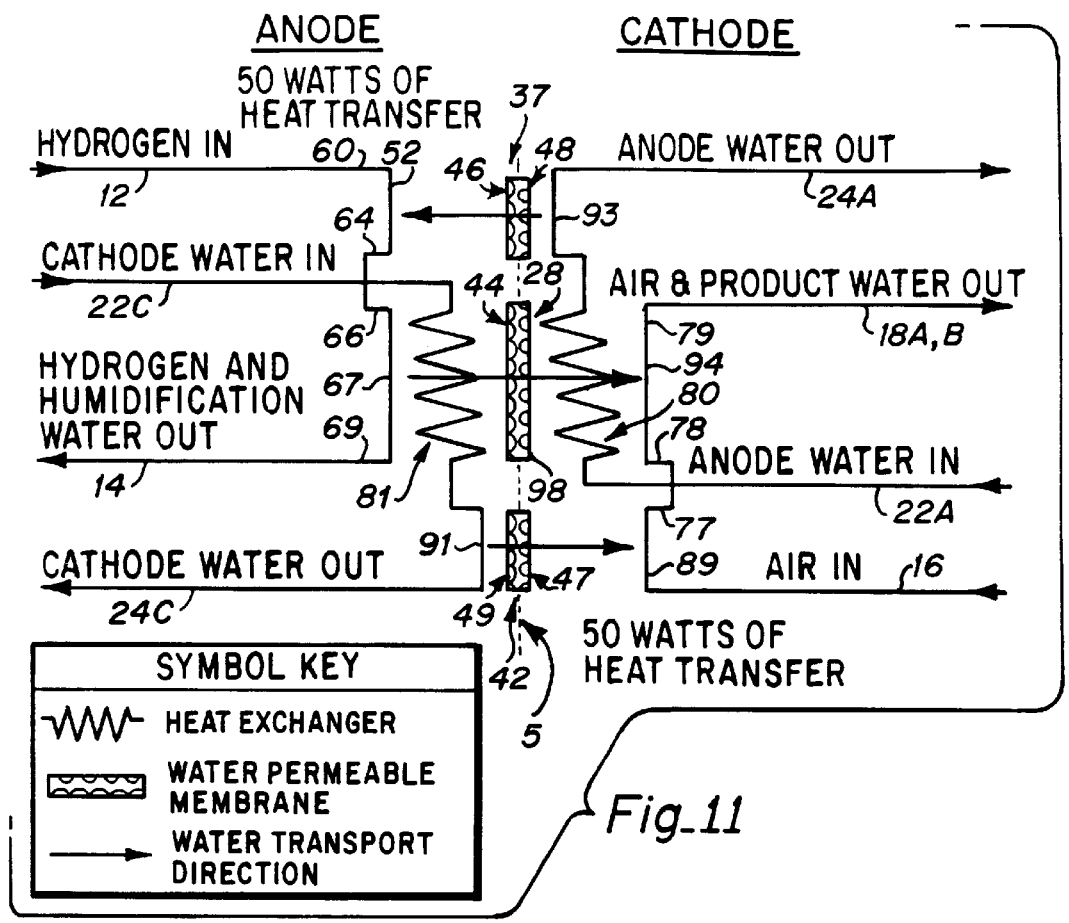
Fig_11
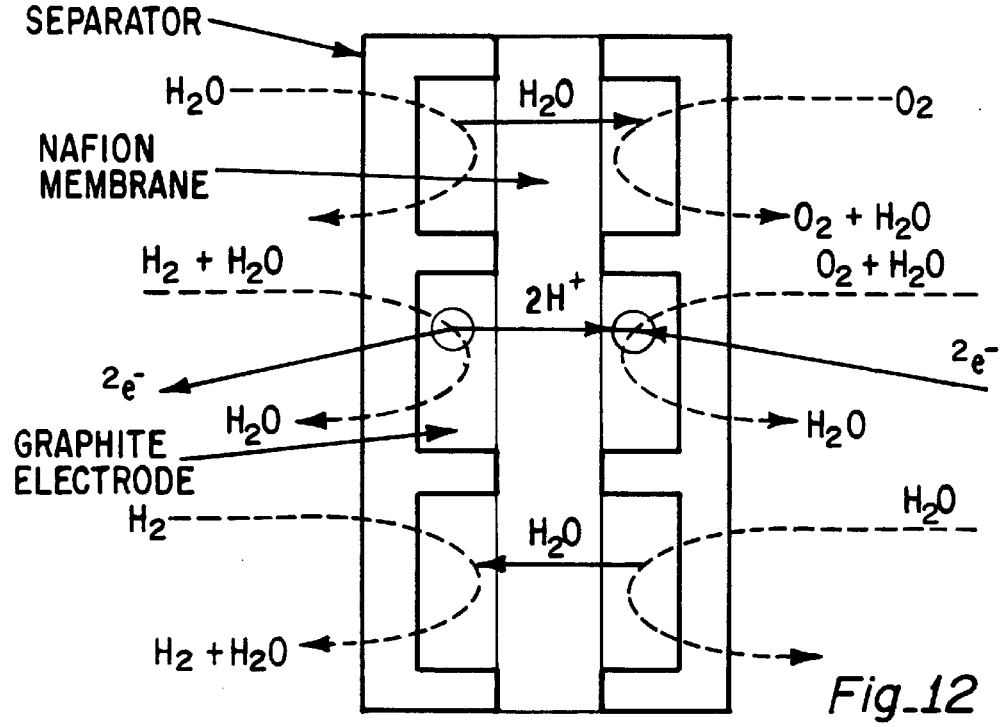
Fig_12

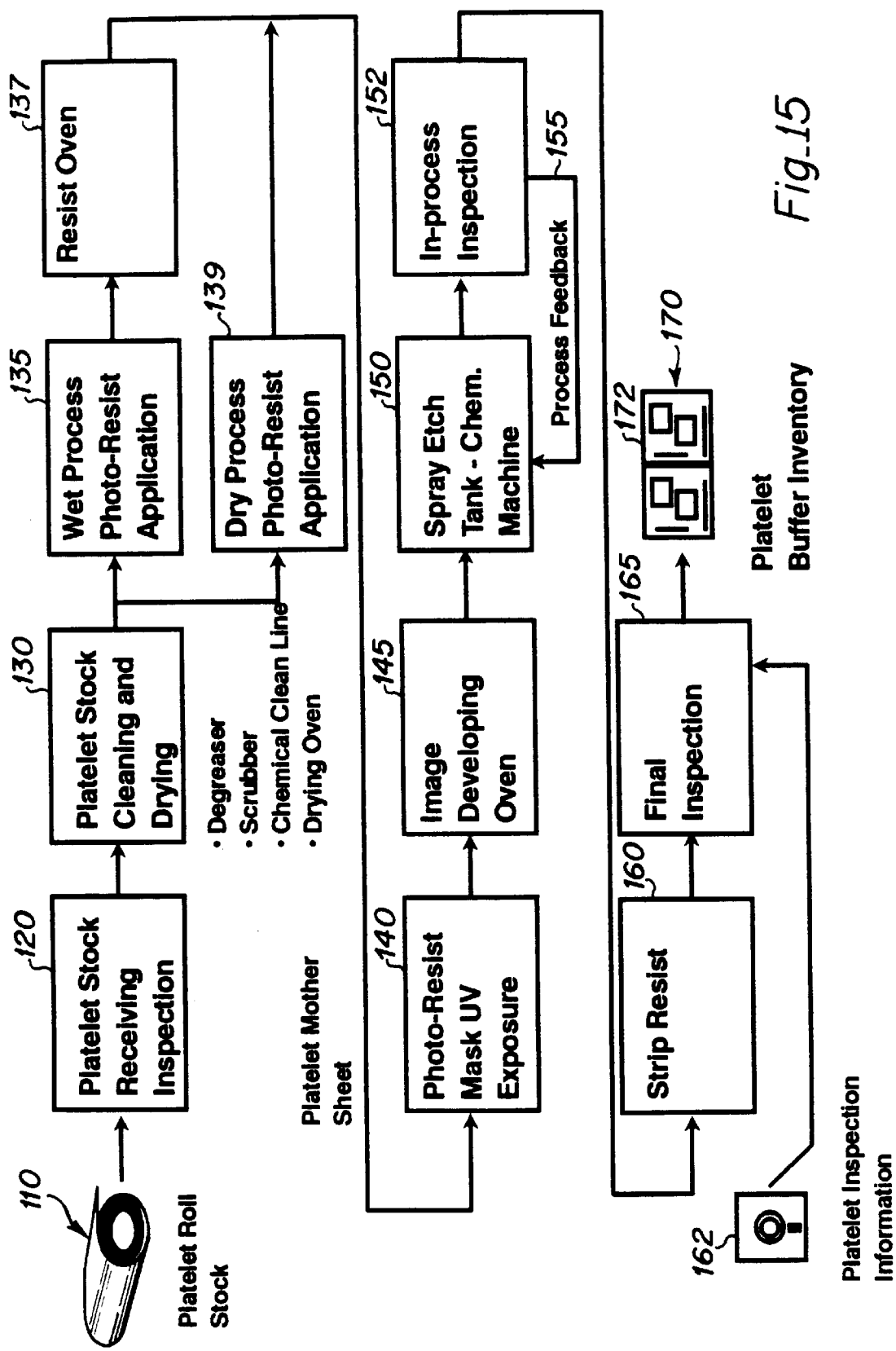
Fig_15

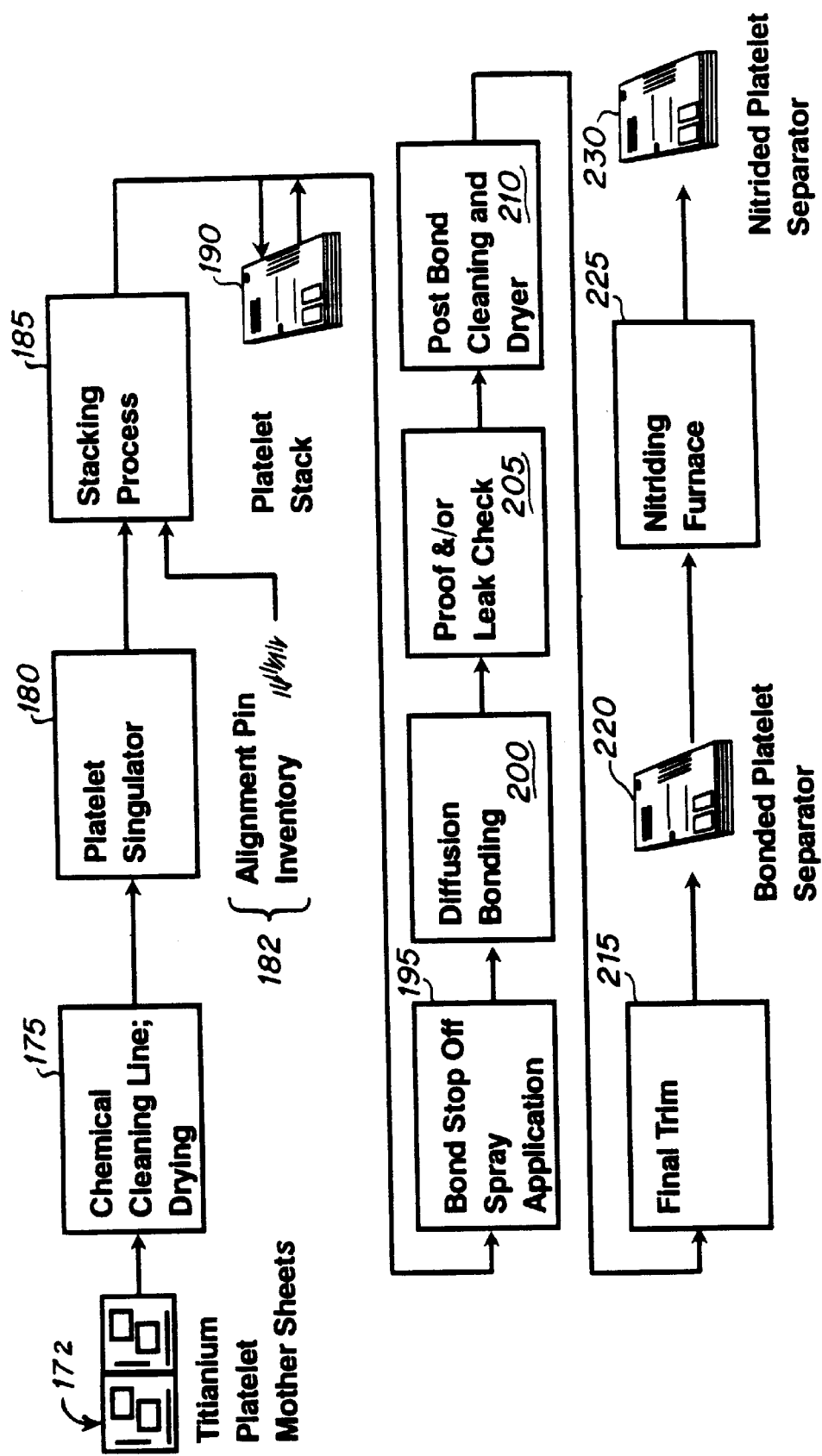
Fig._16

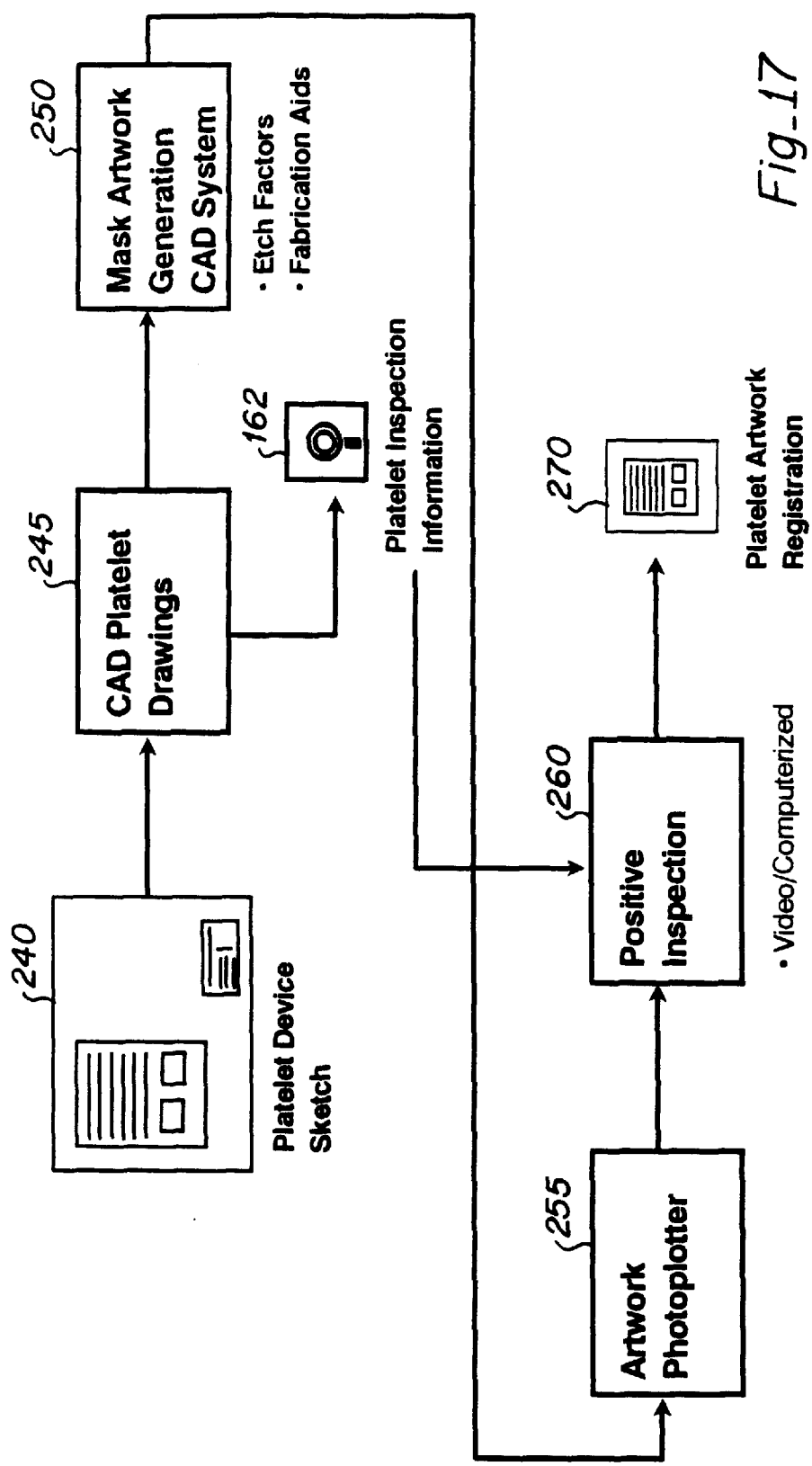

FUEL CELLS EMPLOYING INTEGRATED FLUID MANAGEMENT PLATELET TECHNOLOGY

This application is a continuation Ser. No 08/322,823 filed on Oct. 12, 1994, now abandoned.

FIELD

This invention relates to fuel cells, and more particularly to fuel cells constructed of stacked platelets having integrated fluid management (IFM), and to methods of manufacture and operation of the IFM cells. A particular embodiment employing the principles of this invention is a hydrogen-air/$O_2$ fuel cell employing multiple separators formed of bonded platelets of titanium, niobium, copper, stainless steel, aluminum or plastic having individually configured micro-channel reactant gas, coolant and humidification zones therein, which cells operate in the range of about 50° to 150° C., and have an output of on the order of 0.25–1.0 kW per Kg and 0.5–1.0 kW/L for use in both stationary and mobile power generation applications in open or closed loop configurations. The IFM platelet and separator design can be adjusted throughout the fuel cell stack to accommodate varying thermal management and humidification requirements within each cell.

BACKGROUND

Fuel cells for direct conversion of hydrogen or carbonaceous fuels to electricity have shown great theoretical promise, but have not become widely used in commerce because of technical problems and economic reasons. In the field of hydrogen-air/$O_2$ fuel cells, power density, that is kilowatts of power generation per pound has been marginal, and the lifetime has been unsatisfactorily short. Prior art cells have experienced dropoff in power with age due in part to poisoning of catalysts or electrolyte membranes, and the poor distribution of fuel gases internally has led to thermal hot spots leading to cell failure and the like.

A particularly important class of fuel cells with promise for stationary and mobile electricity generation is the low temperature $H_2/O_2$ fuel cell employing solid polymeric proton exchange membrane having a noble metal catalyst coated on at least one side thereof, which membrane is located between the fuel cell electrodes. These fuel cells employ $H_2$ as fuel, whether directly supplied as such or generated in association with the cell by chemical reaction, such as electrolysis or from metal hydrides. The oxidant is $O_2$ or air, and water is required both for cooling and for humidification of the membrane to keep it from drying out and becoming inefficient or structurally weakened through cracking. Typically, the anode side dries out first for a variety of reasons, including electrosmotic pumping from anode to cathode, the supply of gases in excess of the electrochemical reaction rate, and the air or oxygen flow on the cathode side purges both the product water and the water vapor passing through the membrane from the hydrogen anode side. Accordingly, the fuel gases are humidified in the fuel cell stack to reduce the dehydration effect. The cooling water removes excess heat generated in the slow combustion of the catalyst-mediated electrochemical reaction in the cells, and is conducted external of the stack for heat exchange. In some designs the cooling water is used to humidify the reactant gases.

There are several suitable electrode membrane assemblies (EMAs) available for such low temperature fuel cells. One is from H Power Corp of Bellville, N. J. which employs a Pt catalyst coated on a polymer film, such as duPont NAFION® brand perflourinated hydrocarbon as the membrane. Alternatively, Dow Chemical provides a perflourinated polymer which has been reported in U.S. Pat. No. 5,316,869 as permitting current densities on the order of 4000 amps/s.f. with cell voltages in excess of 0.5 V/cell, for a cell stack power density in excess of 2 kw/s.f.

A typical design of currently available stacks is the Ballard Fuel Cell Stack of 35 active electrochemical cells, 19 thermal management cells, and 14 reactant humidification cells employing a Pt on NAFION N117 EMA in stacks of ¼" thick graphite plates. The stack is reported to have an overall volume of 0.5 cu. ft. with a weight of 94 lbs and a 3 kw output from $H_2$ and $O_2$.

However, the graphite plates must be relatively thick to provide structural integrity and prevent reactant crossover since they are brittle and prone to crack as the cell stacks must be placed under compression to effect intra and inter-cell sealing to prevent gas leakage. They have low thermal and electrical conductivity which gives rise to hot spots and dead spots. They are also difficult to manufacture, especially the gas distribution channels. The output is relatively low, on the order of 0.5 kw/lb.

In the example cited above, the number of inactive cooling and humidification almost equals the number of active electrochemical cells. This effectively doubles the number of gasketed seals required in a stack thereby decreasing stack reliability and performance.

The aforementioned U.S. Pat. No. 5,316,869 does not offer a solution to graphite plate cell stack design as it is concerned with microprocessor control of a closed loop system external to the stack.

Accordingly, there is a need for an improved fuel cell design, and methods of producing the fuel cells and operation thereof which overcome limiting problems of the prior art.

THE INVENTION

OBJECTS

It is among the objects of this invention to provide improved fuel cell design, and methods of construction and operation, particularly fuel cells of the hydrogen and oxygen or air type which show 3× or better improvement over currently available graphite cells.

It is another object of this invention to provide improved fuel cell construction techniques based on multiple platelet and stack technology, which platelets have specially configured gas and water distribution microchannels created by etching, laser ablation or cutting, stamping or embossing.

It is another object to provide an integrated process for manufacture of fuel cells involving photolithography of a series of individual platelets, followed by feature forming by etching, diffusion bonding or stacked platelets under heat and pressure and anti-oxidant coating the platelets and/or sub-assembly polar separators.

It is another object of the invention to provide integrated fluid management (IFM) to fuel cell stack design, particularly to the design of platelets assembled into unipolar or bipolar separators (individual cells), and plural cells into stacks, to improve fuel and oxidant gas humidification and distribution for contact with the membranes, and for heat and humidity control to prevent hot spots and membrane degradation due to dehydration.

It is another object to provide photolithographically and etch-formed platelets for fuel cell separator assemblies having special sealing ridges which permit sealing of EMA between polar separators to form cells which are secured under compression to form fuel cell stacks.

It is another object of the invention to provide variable IFM platelet polar separator design within a fuel cell stack that accommodates the differing thermal environment and humidification requirements that are intra-stack position dependent.

Still other objects will be evident from the specification, drawings and claims of the invention.

BRIEF DESCRIPTION OF DRAWINGS

The invention will be described in more detail by reference to the drawings in which:

FIG. 1 is a schematic section view through a fuel cell stack employing platelet bipolar separators embodying the principles of this invention particularly adapted for operation with $H_2$ and $Air/O_2$;

FIGS. 2A and 2B are schematic section views through a cooled, non-humidified (FIG. 2A) and a humidified and cooled fuel cell IFMT platelet separator of this invention showing the wide variation possible in number of platelets used;

FIG. 4 is an exploded isometric view of one embodiment of a 6–7 platelet separator for an IFMT fuel cell of this invention;

FIGS. 5–10 are detailed plan views of the embodiment of a 6–7 platelet separator of FIG. 4;

FIG. 5A is the front and its mirror image, and back sides of the window frame or windowscreen (1st anode and 7th cathode) sealing platelet;

FIGS. 7A and 7B are the front and back sides of the anode flow field platelet (platelet 3);

FIGS. 8A and 8B are the front and back sides of the cooling platelet, 8A being the anode side and 8B being the cathode side (platelet 4);

FIGS. 9A and 9B are the front and back sides of the cathode flow field platelet (platelet 5);

FIGS. 10A and 10B are the front and back sides of the cathode flow field spacer platelet (platelet 6);

FIG. 11 is a schematic of the fluid circuits into and out of adjacent mating bipolar separators into contact with the membrane showing water, heat and reaactant gases transport therethrough;

FIG. 12 is a schematic drawing of the electrochemistry of a PEM IFMT platelet fuel cell of this invention;

FIG. 15 is a flow sheet of a continuous platelet manufacturing process in which features are formed by depth and through etching;

FIG. 16 is a flow sheet of a process for bonding platelets of this invention into monolithic separators; and FIG. 17 is a flow sheet of the process for adaptively rapid generation of the photolithographic artworks for individual platelet designs in accord with the IPMT principles of this invention.

SUMMARY

Figure 3:
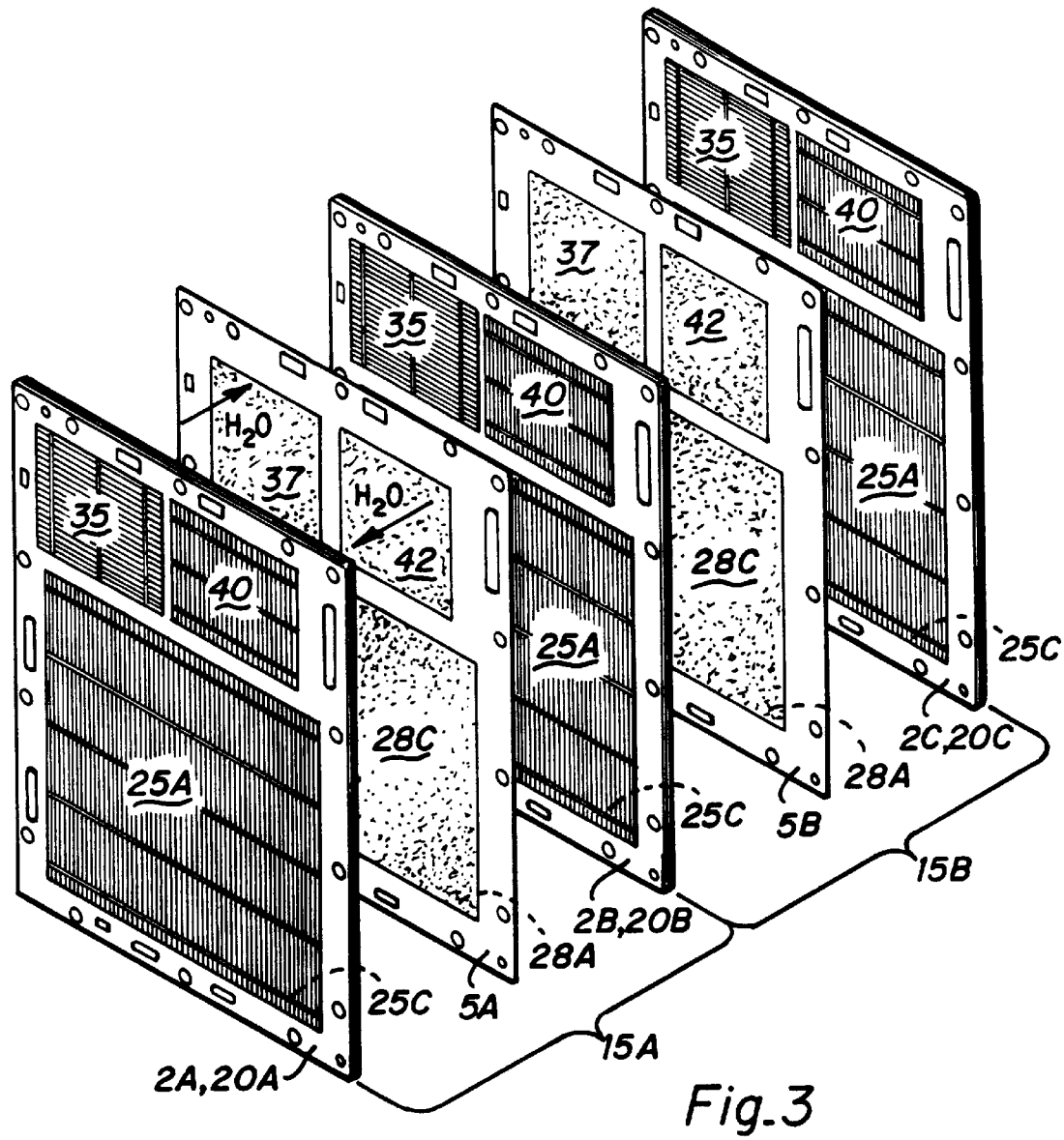
FIG. 3 is a exploded isometric view of a 2-cell subassembly for a IFMT fuel cell of the invention.

The invention is directed to improved fuel cell stacks constructed from a plurality of cells, each comprising a series of interrelated, integrated fluid management (IFM) platelets. The invention also includes methods for design, construction, featuring, assembly and bonding of the platelets into modular polar separators (substack cell assemblies), and methods of operation of fuel cell stacks employing the integrated fluid management technology platelets. While particularly disclosed as applicable to proton exchange membrane (PEM) fuel cells employing $H_2$ and $O_2$/air as fuel, the techniques of this invention are equally applicable to alkaline solid oxide and molten carbonate type fuel cells, and to reformers used in conjunction with fuel cells. A wide variety of other fuel/oxidizer combinations may be employed, such as $NH_3/O_2$; $H_2/X_2$; $CH_3OH/O_2$, and the like (X is a halogen).

The fuel cells of this invention are constructed of one or more cells, each cell of which in turn comprises a pair of bi-polar separators sandwiching an electrode membrane assembly (EMA) therebetween. The separators may be either unipolar (for the end plates) or bipolar, with one side being the anode $(H_2)$ side and the other the cathode $(O_2)$ side. In turn, each polar separator assembly of this invention comprises a plurality of thin plates, preferably of metal, plastic, ceramic or other suitable material into which numerous intricate microgroove fluid distribution channels have been formed, preferably by etching, but also by laser ablation or cutting, embossing, pressing or stamping processes that create through-and-partial-depth features. Adjacent plates having coordinate partial depth features (e.g., half-channels) upon bonding provide gas, coolant and vapor distribution channels, typically round or oval incross section which, by virtue of their continuous, sinusoidal and branching configurations are otherwise impossible to construct.

When two uni-polar separators are assembled with an EMA there between it comprises a cell. An array of aligned cells, when secured together by bonding or clamping means, and optionally including sealing gaskets between cells, comprises a fuel cell stack, a finished fuel cell.

In typical examples, the number of platelets to form an individual cell polar separator subassembly of the overall fuel cell stack may range from 3–10 plates, and preferably 4–7. EMAs are disposed between adjacent polar separators, and preferably are inserted in anode and cathode recesses therein. The presently preferred EMA comprises a 4–10 mil thick sulfonated perfluorinated membrane coated on both sides with a mixture of microfine Pt-black and carbon black in a solvent, and overlain on each side with a 10 mil thick 65% open graphite paper having a Teflon hydrophobic binder therein.

The integrated fluid management fuel cell principles of this invention will be described herein, by way of example only, in reference to a bipolar hydrogen/air or oxygen fuel cell employing a Pt-black/NAFION EMA, operating in the temperature range of from 50°–150° C.

An important feature of the platelet design of this invention is that significant improvements are made in thermal management and in humidification of the gases and electrolyte membranes to very significantly improve the power output of the platelet formed fuel cell of this invention as compared to the prior art. In a preferred embodiment, the cell platelets are constructed of metal, typically aluminum, copper, stainless steel, niobium or titanium. After the platelets are formed, they are then diffusion bonded together by a specific schedule of heat and pressure to form a polar separator subassembly and thereafter, if desired, coated or treated for corrosion resistance. The EMA are then inset into optional membrane recesses (window frame recesses) in the separator plates forming individual electrochemical cells, and a plurality of the cells are stacked to form fuel cells stacks. The entire assembly is then bound under compression to promote sealing, e.g., by through tie rods and nuts, to form a unitary monolithic fuel cell stack.

A wide variety of solid but porous polymeric proton exchange membranes may be employed, typically sulfonated fluorocarbon membranes from Dow Chemical, Asahi Chemical Gore or duPont, with duPont's NAFION being presently preferred. The membrane is coated on both sides with a noble metal catalyst such as Pd, Pt, Rh, Ru or mixtures thereof. A preferred membrane of this type is available from H Power Corp of Bellville, N.J. Other types of EMAS that can be used include porous thin sheets of carbon or graphite, or catalyst-coated polyimidazole membranes.

While a specific membrane type and manufacturer may provide some improvement in performance, the invention is not dependent on any one type of membrane or EMA. The integrated fluid management technology (IFMT) platelet approach of this invention is adaptable to a wide variety of fuel cell types, and improved performance will result therefrom.

The platelet technique permits forming a wide variety of micro-channel designs for any exterior configuration of the fuel cell, yet with excellent thermal exchange and humidity control for more efficient distribution of the gases with no fuel or oxygen starvation and better steady-state electrical output.

An important advantage in the IFM platelet technology of this invention is that the manufacture of the fuel cells can be automated, and employs photolithographic and etching or stamping technology on thin sheet material. Rapid changes can be made in the separator subassembly design. A single factory can support a wide range of fuel cell designs without the need for high output ordinarily required for production economy. That is, fewer fuel cells of widely different design can be produced and still be economically feasible. In addition, the capital investment is substantially and significantly reduced as the production equipment is close to off-the-shelf photolithographic, masking, and etching or stamping equipment.

By way of example, the multiple sheets of a separator can be accurately designed in large format, photographically reduced and the plates stamped out of continuous rolls of metal or conductive plastic sheet material. Alternatively, and in the present best mode, the sheets are photolithographically masked with resist, etched to form the fluid management micro-grooves, the photo-resist mask layer chemically or physically removed, and the platelets cleaned. The finished platelets are then assembled to form the separators, placed in a vacuum furnace having a pressure ram and bonded together under heat and pressure by metal diffusion bonding to form a monolithic separator plate subassembly having intricate internal micro-channels, including channels at different levels orthogonal to each other, through which the various gases and water or other coolant flow. The separator plates are then placed in a nitrogen atmosphere at elevated temperature which results in the reaction of nitrogen with the titanium to form a passinating or an anti-corrosive and conductive titanium nitride layer on all exposed surfaces, including the interior gas and water channels. The platelet design and production can be done on a continuous production line, analogous to a PC-board manufacturing line. The entire multi-platelet sandwich is then diffusion bonded under heat and pressure to form a monolithic separator. The electrode membrane assemblies are then inserted between individual polar separator plates, the separators then stacked, and exterior end plates added to form the completed fuel cell stack. Electrical leads and gases and water manifolding are hooked-up, gases and coolant water are introduced and the cells brought on line.

In a typical 7-platelet IFM bipolar separator subassembly of this invention, the platelets in sequence are:

1. Window frame platelet (to receive an EMA);
2. Anode flow field spacer platelet;
3. Anode flow field (distribution) platelet;
4. Cooling platelet;
5. Cathode flow field (distribution) platelet;
6. Cathode flow field spacer platelet; and
7. Window frame platelet (to receive the EMA of the adjacent cell).

There are 6 different plates, with plates 1 and 7 being identical, and each of plates 2–6 being different. The details of etching and plate design described herein by way of example are shown to evidence that there is no microchannel collapse during the diffusion pressure bonding. In the bipolar separator example above, plates 1, 2, 6 and 7 are each about 12 mils thick (before bonding) and plates 3–5 are each about 20 mils thick. Upon diffusion bonding the plates compress somewhat, and the total thickness of the resulting monolithic bipolar separator laminate is about 100 mils. The total recess depth in facing window plates (the anode window side of bipolar separator number one and the facing cathode window side of bipolar separator number two) is on the order of 20 mils deep. The EMA is on the order of 26 mils thick and is somewhat compliant. The NAFION membrane coated on both sides with the microdispersed Pt-black catalyst in carbon black is on the order of 4–5 mils thick, and each of the outer graphite/teflon paper layers, is about 10 mils thick. These fit snugly in the window frames, and, upon the pressure sealing of the polar separator plates, the EMA compresses into the 20 mils deep window recesses. The graphite paper is on the order of 65% open to provide good and even gases distribution. On the anode side the graphite paper conducts electrons from the catalytic reaction sites on the EMA; to the lands of the separator plates for draw-off as fuel cell electrical output. Electrons return from an external circuit via the cathode. On the cathode side graphite paper conducts electrons from the lands of the separator plate to the reaction sites on the EMA.

The fuel cell multiple bipolar separator stack must be terminated at each end with an anode and a cathode unipolar separator end plate, which also serves as the current collector. For the unipolar anode separator, platelets 1–4 above are used, and for the cathode separator, platelets 4–7 are used. The unipolar platelet separators are then capped at each end with thicker (4–20 mil) solid end plates and secured.

As an alternative example, where no gases humidification is required, a 4-platelet bipolar separator assembly may be employed, and the sequence of platelets is as follows:

1. Anode flow field (distribution) platelet;
2. Cooling manifold platelet;
3. Close-out platelet; solid on anode side and manifolds (micro-grooves) on cathode side.; and
4. Cathode flow field (distribution) platelet.

Additionally, window frame platelets can be used on each side where an inset EMA is used to form a 6-platelet bipolar separator sub-assembly. It should be noted that in place of the window frame platelet, a double-sided compliant gasket member may be used. Thus, the humidified bipolar separator can comprise 5 or 7 platelets depending on whether the optional window frame platelets are used, and for the non-humidified embodiment the bipolar separator comprises 4 or 6 platelets, the latter including the two window frame platelets. Titanium is particularly useful because it can flow together under appropriate pressure, forming an auto-weld of the diffusion bonded (flow) type.

The assembled separator (multi-platelet sub-assembly) is on the order of 100 mils thickness and weighs around 4–8 oz (110–300 grams) depending on the number and thickness of plates and materials. Approximately 10 separators/kw are used in a cell stack. After assembly on the tie rods, compression endplates on the order of 1.5 inches thick are applied and the entire fuel cell stack assembly is placed under compression of 200 psi by threaded tie rods to form the monolithic fuel cell stack. The stack operating pressure of 1–65 psi is easily achievable with output at around 70–150 amps. To seal adjacent separator sub-assemblies, an interlocking sealing ridge (which is generally triangular in cross section) on the order of 1–2 mils in height is etched or pressed in the window frame platelet (outside surface) so that the ridge will fully interlock with the window plate of the adjacent separator sub-assembly, or with the appropriate terminal endplate, as the case may be.

The fuel cells of the IFM platelet design of this invention can include a reformer section to provide $H_2$, e.g., via the steam-shift process employing an underoxidized burner plus steam to produce $H_2$, $O_2$ and $CO_2$. Any other hydrocarbon reformer may be employed in combination with the IFMT platelet cells of this invention.

Typical IFMT platelet fuel cells of this invention exhibit the following operating data:

Two cell test stacks consuming $H_2$ and $O_2$ or air with a PEM EMA at 95° C. show linear output ranging from 0.4V output at 460 mA/cm$^2$ for air to 830 mA/cm$^2$ for $O_2$ and 0.9V output a 10 mA/cm$^2$ for air to 50 mA/cm for $O_2$. For full scale fuel cell stacks of 100 IFMT platelet cells power densities will be in excess of 522 mW/cm$_2$, which is equivalent to 6.79 kW in a cell stack of under 50 lbs. and size of less than 13" long×6" wide×8" high. By contrast, a graphite plate fuel cell with output in the range of 5–7 kW weighs in the range of from 100–500 lbs. For automotive useage a fuel cell output of 10–40 kW is required and buses 100–150 kW is required. Thus, the IMFT platelet fuel cells of this invention are able to meet current electric vehicle needs.

A key feature of the platelets of this invention is the use in combination of etched gas and water distribution channels, formed in corresponding, aligned half channels in each of a pair of coordinate opposed mating plate faces (i.e., mating faces of adjacent plates that face each other and contact each other in the stack), and similarly etched delivery manifolds. Optional but preferred are etched sealing ridges on the periphery of the plates to assist in sealing adjacent cell assemblies.

Critical to efficient high-output operation of PEM cells is proper thermal balance and hydration, and control thereof by uniform gas flow.

Current PEM fuel cells exhibit problems of poor thermal management and water balance, low graphite conductivity and ductility, limited scalability and reactant depletion. Proper thermal management in PEM cells is critical as current membranes have a maximum operating temperature in the range of 90°–98° C., since temperatures above that permanently ruin the membrane by damaging the pore structure. Since the fuel cells of this invention have heat exchanger sections integrated in each bipolar separator, as compared to one between every 4–5 separators in graphite PEM cells, our stacks can be scaled easily to larger sizes since both the heat generation and control (heat exchange) scale with area. Since we can easily tailor heat control to each type of membrane and fuel, and the intra-cell location within the stack we can employ higher performance EMAs, resulting in higher power densities.

In regard to water balance, the integrated humidification in each separator maintains better water balance as they are individually varied to accommodate the different requirements of the anode and cathode sides of the fuel cell. Water is removed from the anode side by electro-osmotic pumping through the membrane and reactant gas flow drying. Water builds up on the cathode side from the throughput of the electro-osmotic pumping and production of reaction water, which are both removed by air/$O_2$ gas flow drying.

In contrast to graphite PEM cells, the metal platelets of this invention are some 30 times more conductive, thus reducing the $I_2R$ losses in the stack under high current densities. These losses reduce voltage and power obtainable from the stack. The lower internal resistance of the metal separators provides a more even distribution of current, thus reducing the build-up of hot spots and dead spots in the cells. Graphite separators are under compression to effect sealing, but pressure affects the resistance of graphite in a non-linear fashion. This characteristic makes it very difficult to produce graphite cells with uniform output. In contrast, metal separators have excellent thermal and electrical conductivity which eliminates hot and dead spots. Graphite is porous to $H_2$, $O_2$ and air which reduces the chemical efficiency of graphite stacks because some $H_2$ is consumed in non-production direct oxidation.

Graphite separators also crack when the cell is subjected to compression to effect the sealing necessary to prevent gases leakage, the cells operating at 2–60 psig. The tendency to crack severely limits the number and size of the cells in the stack, and where one or more separators on the interior of the stack develops leaks, the electrical output is compromised or significantly reduced. Metal platelets, being ductile do not present these problems.

Further, it is an important aspect of the invention that the IFM technology of the invention permits variation of intra-stack platelet design to effect better thermal management. That is, the cells in the middle of an uncooled stack do not have the same thermal environment, and accordingly not the same humidification requirements of cells at or nearer the ends of the stack. The platelet design, in terms of relative anode, cathode, coolant and humidification micro-channel design can be easily changed and intra-stack position defined to accommodate the various gradients within the stack. Likewise, stacks can be designed to suit a wide variety of external conditions, an arctic design differing from a tropical, and a subsea differing from a sapce design.

This flexibility of design—the capability to tailor the configuration and path lengths and channel widths of micro-channels in each zone of the separator (anode, cathode, heat exchange and humidification) and from separator to separator (cell to cell) progressively and individually within the stack to accommodate the intra stack environment and gradients—results in ease of scaling to higher power outputs, e.g., on the order of greater than 50–100 kw.

The series/parallel serpentine channel design provides more uniform distribution of the reactant gases. This is particularly important in providing significantly better cathode performance when operating on air due to depletion of $O_2$ as the air travels through the channels. In current channel design, air enters $O_2$ rich and leaves $O_2$ depleted, since the $O_2$ is consumed in the electrochemical reaction. The same depletion effect is true of $H_2$. In our invention, the shorter series of channels manifolded in parallel, and the ability to design and redesign channels of varying configurations, or graduated width, improves cathode kinetics, a currently dominant limitation of current fuel cells. In this invention, the flow is divided into a series of parallel circuits in which the precise pressure drops can be obtained. By increasing the number of parallel circuits, the pressure drop can be lowered as the flow rate is reduced and the channel side wall frictional effects are reduced due to shorter path length.

While the currently preferred best mode of the invention employs window frame platelets with carbon paper over the catalyst/graphite-black coated membrane to provide a highly porous sheet having random gas distribution channels there through, an important alternative embodiment of the invention employs a carbon-paper-less membrane wherein microfine holes are etched through the "window pane area" of the window frame to effect the same gas distribution function. In producing the window frame platelet, the window pane area is defined in the appropriate medial areas of the plate that is located interiorly of the outer plate edges. (Lines defining the pane area may be through-etched except for a few thin bridges holding the window pane section in place during platelet fabrication. The bridges are later cut and the pane removed, or let fall out, to complete the window frame platelet.) The open areas receive the carbon fiber paper upon compression of the full sheet membrane between adjacent platelets. In the alternate embodiment, instead of removing the window pane area material, a "window screen" area is created in the window pane area by micro fine through etching, the holes being on the order of 5000–10,000/sq. inch. Then the catalyst-coated graphite paperless membrane is compressed between the adjacent separator plates.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows in simplified (schematic) cross section a fuel cell stack 1 of this invention employing a plurality of multi-platelet bipolar separators 2A, B, C and a pair of cathode and anode unipolar end separators 3, 4 respectively. Proton exchange Electrode Membrane Assemblies (EMA) 5A, B, C, and D are disposed between the separators as shown. Air and/or $O_2$ is inlet via manifold system 6, $H_2$ and/or other fuel inlet via manifold 7, and cooling/humidification water is inlet at 8 and outlet at 9.

FIG. 2 shows in schematic section view the construction of one embodiment of bipolar separators 2 formed from bonded platelets 10 for the non-humidified version of FIG. 2A, and platelets 30 for the humidified version 20 of FIG. 2B. FIG. 2 also illustrates the wide variation in the number of plates that may be employed to construct a separator by various combinations of depth etching (or depth feature forming) and through-etching (through feature forming). For example, FIG. 2A shows a 7-plate configuration as follows:

10A is a window frame or windowscreen platelet; 10B is an anode flow field platelet (or optimally pair of platelets, one an anode spacer platelet and the one to the right being an anode flow field platelet); 10C is a close-out platelet; 10D is a cooling flow field platelet which can be through-etched or can have plural coolant paths by employing differing serpentine channels depth-etched from the opposite sides but not communicating throughout their length (they can communicate by through-etched vias); 10E is a close-out platelet; 10F is the cathode flow field platelet corresponding to 10B; and 10G is a window frame or window pane platelet like 10A. The bottom of FIG. 2A illustrates a 5-plate grouping; 10-1 and 10-5 are window frame or windowscreen platelets; 10-2 is a single platelet depth-etched from the anode side; 10-3 is a single cooling platelet; and 10-4 is the cathode analog of 10-2. Thus, the stack configuration can vary from 5 platelets to 11 platelets, in the later case 10B and/or 10F are two platelets, and 10D may be three platelets.

Similarly, FIG. 2B may range from 3 or 4 to 20 platelets, seven being shown (30-1 through 30-7) depending on the desired platelet configuration, which in large part may be dictated by material and manufacturing considerations, or by fuel cell or membrane type, but all of which may employ the IFMT principles of the invention. Thus, while 30-4 is shown as a single platelet, it may be three platelets, two through-etched with an intermediate shim or close-out platelet.

FIG. 3 is an exploded isometric view of two cells 15A, 15B internal of the stack comprising separators 2A (or 20A), 2B (or 20B) and 20C (or 20C) sandwiching two EMAs 5A, 5B. In this view, only the $H_2$(anode) side of the bipolar separators are visable, but as shown below, there are coordinate $O_2$ zones on the hidden (cathode) side. The large areas 25A are the active areas of the cell, 25A representing the anode side and 25C the cathode side. Anode humidification zones 35 and cathode humidification zone 40 are present in the separators, and described in more detail below.

The EMAs 5A 5B include catalyst coated areas 28A, 28C corresponding to the active areas 25A, C. The areas 37, 42 are not catalyst coated and correspond to the anode and cathode humidification zones 35, 40 respectively. Alignment holes and manifold vias are evident adjacent the margins of the platelets and the PEM/EMA sheets.

FIG. 4 is an exploded isometric view of a 7-platelet humidified IFMT bipolar separator 20 of this invention comprising platelets of six different types, comprising platelets of six different types, platelets 30-1 and 30-7 being identical window frame or windowscreen platelets (window frame being shown), which may include sealing ridges (not shown) around the cut-outs, the active area 25, the humidification areas 35, 40, and around the transverse through-etched reactant gas and coolant manifolds. The sealing ridges can be embossed or etched in the platelet.

Platelet 30-2 is the anode flow field spacer platelet having through-etched channels and vias, and depth-etched manifolds and tab features. In all platelets 30-2 to 30-7 the through-etched transverse border passages or manifolds are coordinate with those of platelet 30-1. Platelet 30-3 is the anode flow field platelet with depth-etched channels coordinate with the through-etched channels of platelet 30-1. Platelet 30-4 is the cooling platelet with the anode side showing plural parallel depth-etched serpentine cooling channels in half the active area. The non-visible obverse side has cathode cooling channels, also depth-etched and covering the other half of the active area. Platelet 30-5 is the cathode flow field platelet with depth-etched channels on the obverse side, not visible in FIG. 4, but the analog of platelet 30-3. Platelet 30-6 is the cathode flow field spacer platelet with through-etched channels coordinate with plate 30-5, through-etched vias, and depth-etched tabs analogous to platelet 30.2. Platelet 30-7 is the cathode window frame (or window screen) platelet having sealing ridges as described above for platelet 30-1 on the obverse side.

FIGS. 5–10 are a series showing in plan view from the facing side of each platelet the details of one embodiment of the through- and depth-etching features of the 7-platelet bipolar separator plate of FIG. 4 in accord with the IFM principles of the invention. It should be noted that the progression of plates is as shown in FIG. 4, with the figure designation –A being the front of the plate as seen from the anode (foreground) side of FIG. 4. However, the –B side is the non-visible side of the respective platelets of FIG. 4 when turned over. That is, the views are all artwork or plate face-up views. Platelets 1 and 7 are essentially the same with the exception of when sealing ridges are employed, FIG. 5 being the front of platelet 1 and the back of platelet 7, while the mirror image of FIG. 5 would be the back of platelet 1 and the front of platelet 7. FIG. 5 shows the embodiment where gaskets are employed to seal the bipolar separator to the EMA. Where no gasket is used the front of the anode platelet may have a single ridge that is aligned to interlock in a groove between two ridges on the back of the cathode platelet. FIG. 5 depicts the anode-facing surface of the Anode Sealing Platelet 30-1 and the Cathode Sealing Platelet 30-7, also called window frame or window screen platelets. This surface may have 1–2 mil sealing ridges around the internal manifold passages (the rounded corner rectangles) and the flow fields. The major features of this platelet are the three large rectangles. These rectangles allow space to compressively receive graphite paper of the membrane electrode assemblies. Rectangle 25 is the Anode Active Area Flow Field cutout (or screen area). The top left rectangle 35 is the Fuel (hydrogen) Humidification Flow Field. The top right rectangle 40 is the cut out for the Cathode Humidification Water Flow Field. Transverse through-etched reactant gas (12, 14, 16, 18) and coolant (22, 24) manifolds are arranged across the top, bottom and sides of the platelet. The smallest manifold is for fuel (hydrogen), with 12 being input and 14 output. The two middle sized manifolds are for water cooling and humidification circuits with 22A, 22C being inlets, and 24A, 24C being outlets. The two large manifolds are for air (oxygen), with 16 being an inlet and 18A, 18B being outlets.

Sealing ridges may be located at 27 around each of transverse manifolds and the pockets (cutouts or screens 25, 35, 40). The manifold and flow field sealing ridges are formed by insitu embossing during the platelet bonding process. An alternative process is sealing ridge formation by depth-etching the platelet a second time. The first etching through etches the manifold, field, alignment and tie rod holes. The second etching forms the ridges.

FIG. 5 also depicts the through-etched; stacking alignment holes 32 and through-hole tie rod holes 34. Stacking holes are used to precisely align the platelets for the bonding process. The back of this platelet is the mirror image of the front without sealing ridges regardless of whether sealing ridges or a gasket is employed. The front of platelet 30-7 is the mirror image of FIG. 5, and the back of platelet 30-7 is FIG. 5, with or without cooperating sealing ridges as described above.

FIG. 6 depicts the front side of the Anode Flow Field Spacer Platelet through-etched series parallel fuel (hydrogen) flow field 44, the fuel (hydrogen) humidification field 46, and cathode water chanel field 49 for humidifying the $O_2$ on the cathode side of the membrane. These channels are designed to optimize the flow rates and pressure drops of the device. This drawing also depicts the continuation of the through-etched transverse manifolds for fuel (hydrogen), air (oxygen) and water coolant, 12, 14, 16, 18, 22 and 24, in-out, respectively.

Figure 6A:
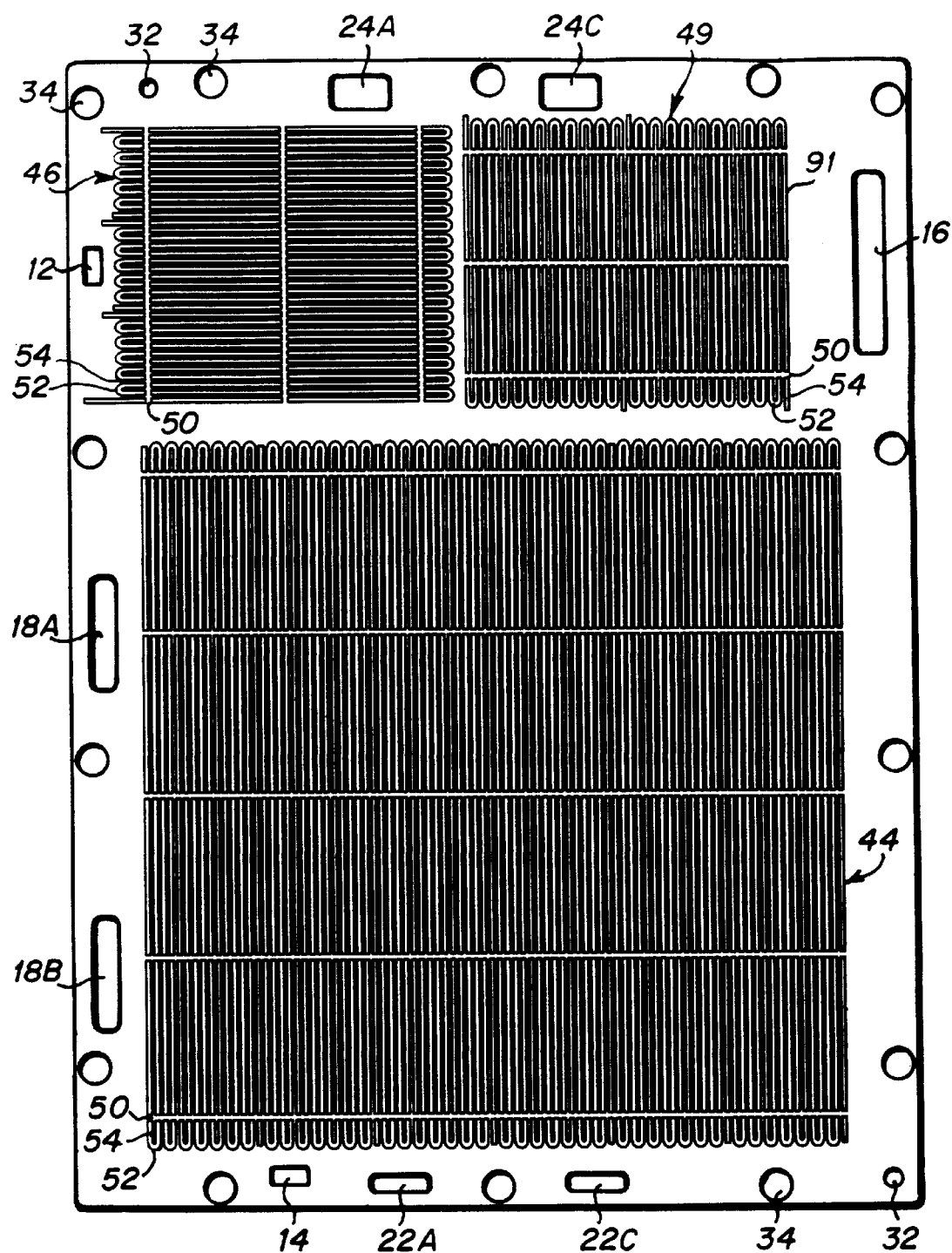
FIGS. 6A and 6B are the front and back sides of the anode flow field spacer platelet (platelet 2)
Figure 6B:
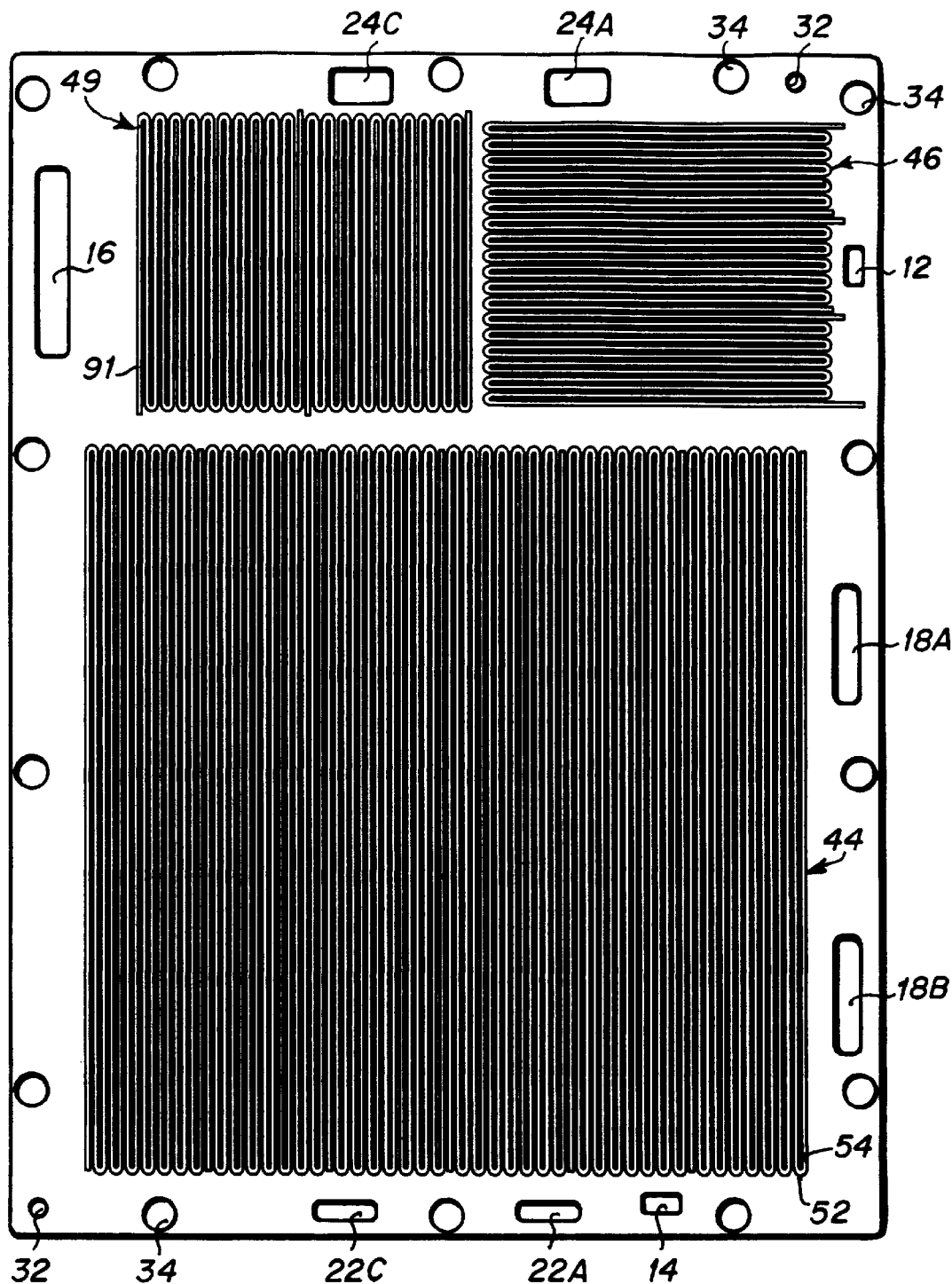

This drawing also depicts a very important aspect of the invention, the tabs 50 which are not through-etched, i.e., are only depth etched as compared to the channels 52 which are through-etched (in this platelet) and tie together the alternating, spaced lands 42. As can be seen in FIG. 6B, the tabs are not visible, but the channels 52 and spacer lands 54 are. The tabs are depth-etched away only from the back (FIG. 6B) side leaving them on the front side. Depth-etching is approximately 60% of the full plate thickness. Through-etching is accomplished by depth-etching, via appropriate masking, from both sides of the platelets. Depth-etching is only from one side. The same is true of the humidification fields 46 and 48. The FIG. 6B backside also depicts the continuation of the through-etched flow field channels 52, and the various manifolds, alignment holes and tie rod holes. This platelet does not exhibit manifolding to the $H_2$, $O_2$ and water inlets and outlets.

FIG. 7A depicts the front side of the Anode Flow Field Platelet having a series of depth-etched parallel channels forming the hydrogen active area flow field 44, hydrogen humidification area 46 and water channels 91 in field 49. These channels 52 and lands 54 are precisely aligned and match the flow field channels and lands found in the Anode Flow Field Spacer Platelet of FIGS. 6A, B. Also showing up on this platelet are depth-etched distribution channel extensions 56 into and out of the hydrogen humidification flow field 46. (To follow the $H_2$ flow in the fields, also refer to FIG. 8A.) The $H_2$ flows in from the transverse inlet 12 through distribution manifold 60 (FIG. 8A) up field inlet vias 61 (FIGS. 7A and 7B) into the $H_2$ distribution humidification channels 62 (FIG. 7A), which are shown as 3 sets of parallel serpentine channels comprising hydrogen humidification field 46. The $H_2$ exits the field at near 100% humidity through outlet vias 63 (FIGS. 7A, 7B) to the outlet collection manifold 64 (FIG. 8A) to square via 65 (FIGS. 7B and 8A) and back up to the hydrogen gas distribution inlet manifold 66 of the anode active field 44. There are six parallel sets of serpentine channels 67 in the active field. The residual $H_2$ exits the field through extensions 68, thence through exhaust manifold 69 out the transverse outlet 14. The manifolds and the vias are engineered to insure uniform distribution of hydrogen across the flow field. The vias 61, 63 are sized to function as metering ports. Engineering the distribution and collection manifolds permits the pressure drops and flow rates to be precisely controlled. The vias 61, 63, 65 and manifolds in subsequent plates (FIGS. 7B and 8A) may be superimposed to easily discern the flow path between plates.

FIG. 7B depicts the back of the Anode Flow Field Platelet with through-etched transverse metering orifices (vias) 61 that regulate fuel (hydrogen) flow from the transverse $H_2$ fuel inlet 12 and depth-etched manifold 60 (FIG. 8A) into the $H_2$ humidification field 46 (FIG. 7A). The through-holes (vias) 63 are the output to depth-etched manifold 64 (FIG. 8A) communicating via square feed hole (via) 65 to the inlet manifold 66 of the active field 44. The $H_2$ outlet is via depth-etched manifold 69 to outlet transverse hole 14.

In FIG. 7B, cathode coolant water is inlet at transverse hole (manifold) 22C and hot water outlet from vias 70, 71 into the humidification zone 49 (FIG. 7A) then, and out of the zone 49 through vias 72, 73 to manifold 74 (FIG. 8A) and out transverse manifold 24C. Likewise, air/$O_2$ is inlet from transverse manifold 16 to depth-etched air inlet manifold 76 (FIG. 8A), into the air cathode water channels in field 47 (FIG. 9B) out the depth-etched air distribution manifold 77 and down into the cathode active area 98 (FIGS. 9B and 10A) through depth-etched manifold 78. The spent air is collected by exhaust manifold 79 and it then flows out through the transverse manifold holes 18A, 18B.

Figure 8A:
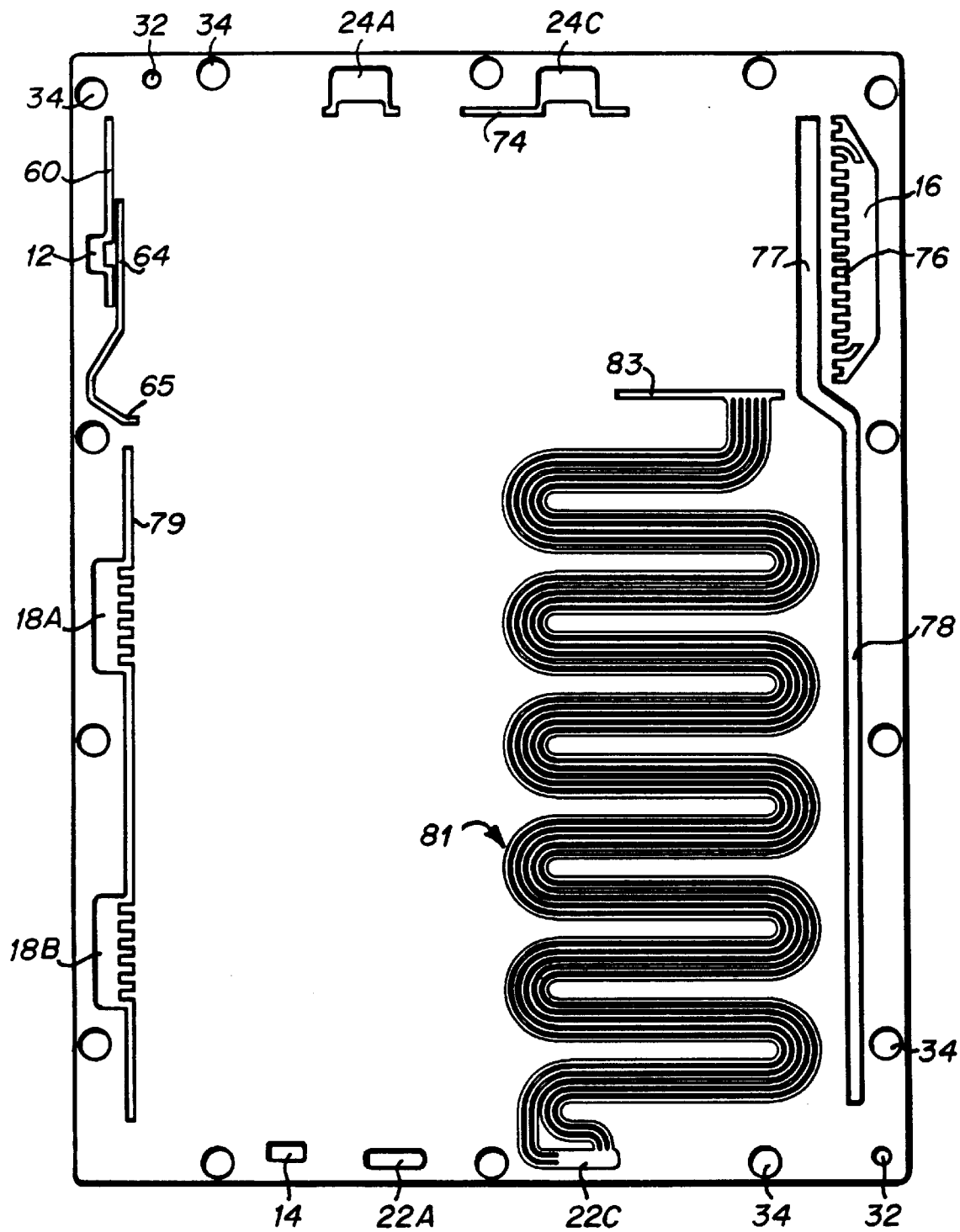

FIG. 8A depicts the front of the anode and cathode cooling platelet, with two sets of three depth-etched serpentine cooling fluid channels 81 covering half the active flow field area to handle half the thermal load. Water enters the serpentine 81 through port 22C and exits by manifold 83. Hot water then passes through vias 70, 71 (see FIG. 7B) into the cathode water field 49 (see FIG. 7A). Water molecules diffuse through the membrane to humidify the oxygen on the other side of the membrane. The water exits through vias 72, 73 (FIGS. 7A, 7B), is collected by manifold 74 and exists the stack through transverse manifold passage 24c.

This plate also shows air/$O_2$ inlet manifold 76 and the air distribution manifold 77 and 78 which are joined and through-etched, as can be seen as can be seen from FIG. 8B. Likewise, the spent air collection manifold 79 is through-etched in this platelet (platelet 30-4 of FIG. 4), but all three are only depth-etched on the facing side of platelet 7B.

FIG. 8B depicts the back of this anode and cathode cooling platelet, the backside being the cathode side, and shares similar features with the exception that there are no depth-etched $H_2$ distribution manifolds 60, 64 and no via 65. Since this is the cathode side the water inlet is 22A, the serpentines are 80, the hot water collection manifold is 82, and the water outlet manifold is 75. The manifold 82 communicates with anode water field 48 by hot water vias 84, 85, and the water exits field 48 through vias 86, 87 to the manifold 75. The serpentines 80 handle the other half of the heat load from the active area field 44.

Figure 9B:
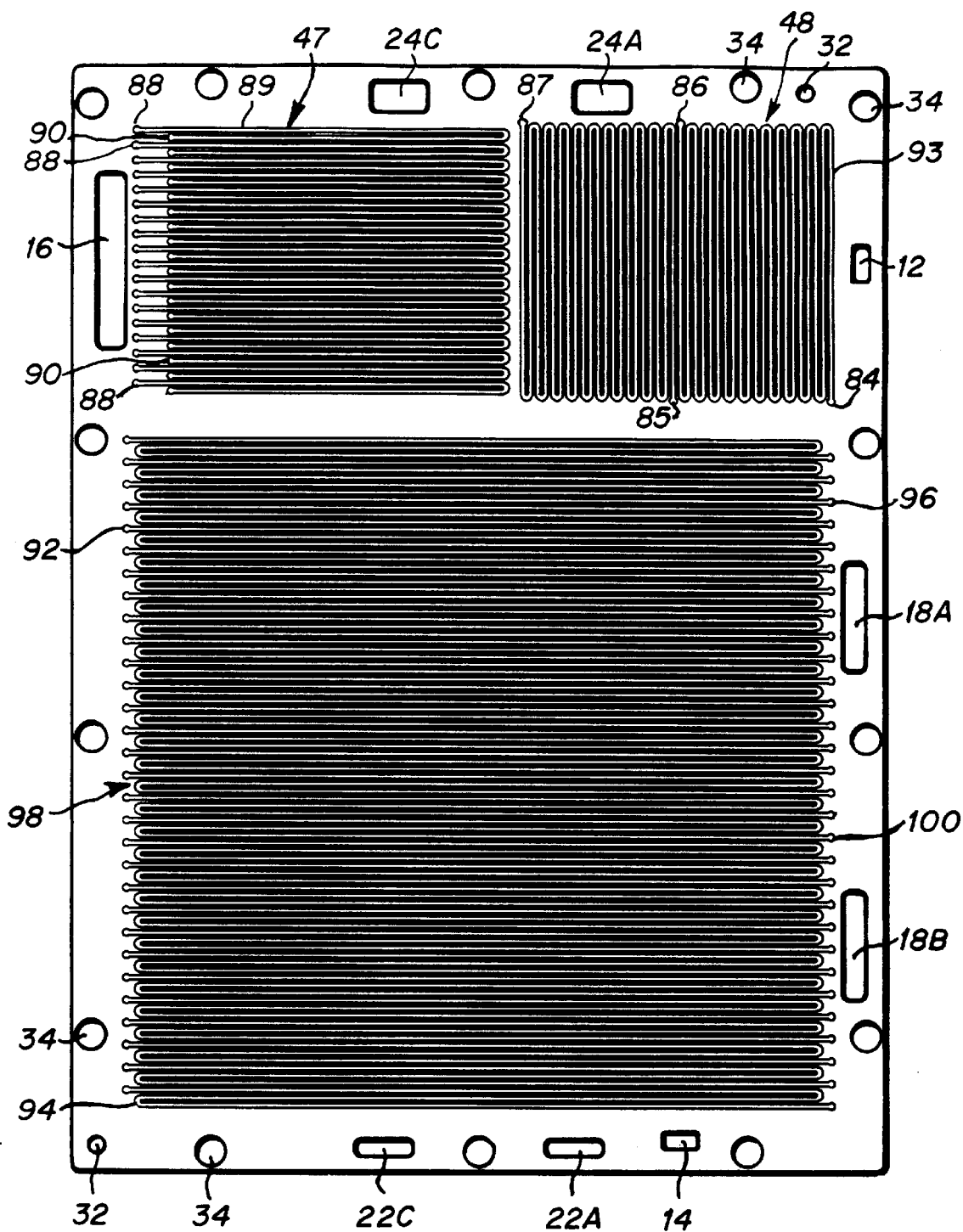

FIG. 9A depicts the front of the Cathode Flow Field Platelet with depth-etched $O_2$ inlet distribution manifold 78, the exhaust collection manifold 79, as well as the through-etched transverse manifold for $H_2$(12 inlet; 14 outlet), $O_2$(16 inlet; 18 outlet) and water (22A, C inlet; 24A, C outlet). There are also a row of $O_2$ inlet vias 88 for inlet of $O_2$ to the $O_2$ humidification field 47 (FIG. 9B) and outlet vias 90 from the $O_2$ humidification field 47. The humidified $O_2$ inlet manifold communicates with $O_2$ cathode active field vias 92 (FIG. 9B) while the spent $O_2$ exits through vias 96 (FIG. 9B) to the exhaust collection manifold 79 and out the $O_2$ transverse manifolds 18A, 18B.

FIG. 9B depicts the back of the cathode flow field platelet (platelet 30-5 of FIG. 4) which is analogous to the front of the anode flow field platelet (platelet 30-3 of FIG. 4) except that the $O_2$ serpentines 89 in the $O_2$ humidification field 47 and 94 in the cathode $O_2$ active are 98 are shorter, due to the increased viscosity of the Air/$O_2$ as compared to Hydrogen. Note for 3 serpentines for $H_2$, there are 18 for $O_2$. $O_2$ passes from the transverse inlet 16 through inlet manifold 76 (FIG. 8A) to inlet vias 88 (FIGS. 9A and 9B) into the field 47 and out vias 90 to the distribution manifolds 77, 78 (FIG. 8A) and thence into the cathode active area 98 serpentine through vias 96 (FIG. 9B). The spent Air/$O_2$ leaves through vias 100 to the exhaust collection manifold 79 (FIG. 9A) and thence out the transverse manifold outlets 18A, 18B. As noted above, the fields 47, 49 and 98 are depth-etched to define channels and intermediate lands.

FIG. 10A depicts the front of the Cathode Flow Field Spacer Platelet with through-etched channel flow fields 47, 48 and 98 as described above. This plate is analogous to the anode flow field spacer (platelet 30-2 in FIG.4); except that the serpentines are designed for the $O_2$ to minimize the pressure drop and maximize flow rate.

FIG. 10B depicts the back of the cathode Field Spacer Platelet (platelet 30-6 of FIG. 4) which is analogous to the front of the anode spacer platelet (30-2 of FIG. 4) in that the tabs 50 retain the lands 102 between adjacent through-etched channels 94 in the active cathode field 98, the channels 93 of anode water field 48 and the oxygen channels 89 of $O_2$ humidification field 47. The lands, channels and tabs are formed as above described.

FIG. 11 illustrates the hydrogen, oxygen and the humidification and cooling water circuits through a pair of separators, the anode side of a first separator being labeled "Anode" and the cathode side of the next separator in the stack being labeled "Cathode" with a water-permeable EMA 5 disposed therebetween. The numbering of elements is coded to FIGS. 3 and 5–10 above. Note the hydrogen input through transverse manifold 12 is first humidified in channels 52 of area 46 by hot water molecules transported by diffusion through the humidification membrane area 37 from anode water channels 93 (on the cathode side in area 48) to the hydrogen humidification channels 52 in the humidification area (zone) 46. The humidified hydrogen then passes through channels 67 in active area 44 of the active electrode membrane section 28, and excess hydrogen and humidification water exits out through outlet manifold 14.

The anode water comes in through inlet transverse manifold 22A, is heated in the serpentine heat exchanger 80 where it withdraws half the heat from the reacting $H_2$ and $O_2$ in the channels 80 of active area 28 and delivers hot water to the membrane 37 in area 48. The cathode water correspondingly comes in through manifold 22C receives heat in serpentine heat exchanger 81 and delivers hot water to the membrane 42 from channels 91 in area 49, and this hot water diffuses across the manifold or membrane and is picked up by incoming cathode air in channels 89 in area 47 on the other side of the membrane.

The cathode air comes in through inlet transverse manifold 16, is humidified in channels 89 of area 47 by the hot cathode water in channels 91 in area 49 passing vapor or molecules through the membrane area 42. The humidified cathode air then passes through channels 94 in the active area 98, and the $O_2$ depleted air and reaction product water is vented through manifolds 18A, B.

Note the net effect is humidification water vapor passes through a first area of the membrane from the cathode side to humidify $H_2$ on the anode side of the membrane, while water vapor passes from the anode side through a second area of the membrane to humidify incoming cathode air on the cathode side. A third membrane area is the active area where reaction takes place while water on each side is used to remove half the heat, and the net flow of product water in this zone is from the anode side to the cathode side.

FIG. 12 depicts the overall fuel cell operation in which $H_2$ on the anode side gives up two electrodes at the graphite electrode (anode), and the resulting two protons diffuse through the wet NAFION membrane (indicated by $H_2$ in the membrane) to the cathode graphite electrode where they combine with $O_2$ and two electrodes to form $H_2O$.

Figure 13:
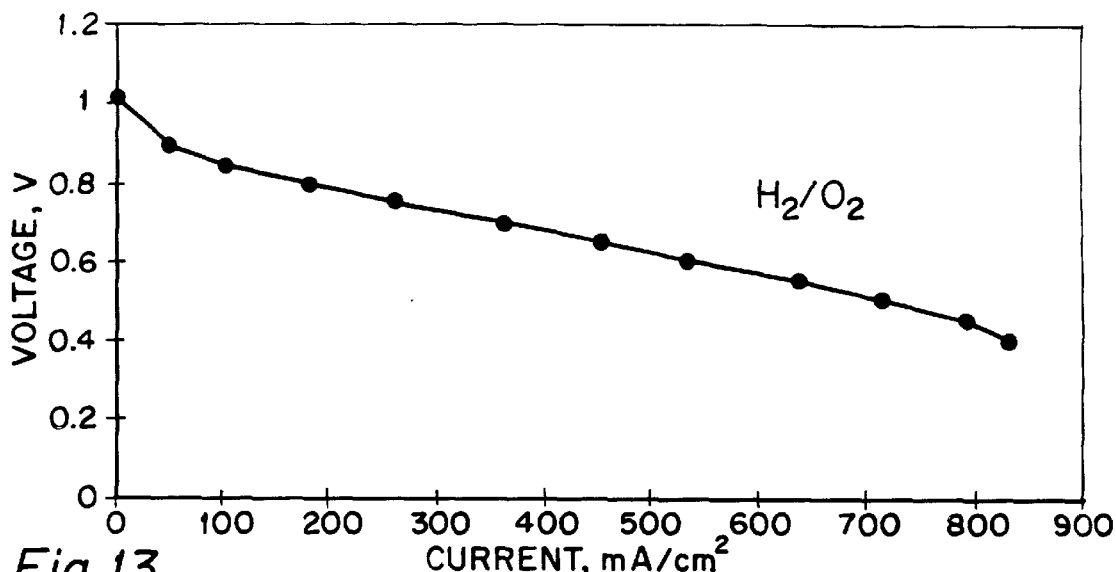
FIG. 13 is a plot of cell voltage vs current density of an $H_2/O_2$-2-cell fuel cell of this invention.
Figure 14:
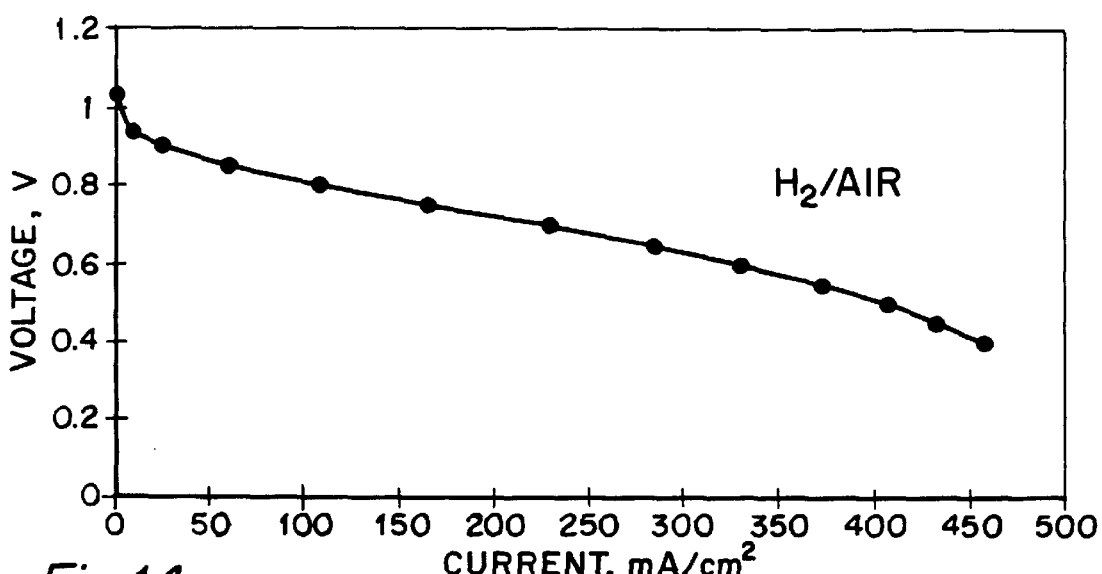
FIG. 14 is a plot of cell voltage vs current density of an $H_2/Air$ test 2-cell stack of this invention.

FIGS. 13–14 are graphs of the output in terms of cell voltage vs current density of actual test fuel cell stacks employing the IFMT platelet principles of this invention. In both tests a cell having 2 cells employing 7-platelet separators as in FIGS. 4–10 were used. The active area totaled 129 square centimeters. A pt-black in carbon black coated NAFION Membrane Electrode Assembly from H Power Corp. was employed. The operating parameters were: T=95° C.; P $H_2/O_2$ =15/25 psig; fuel $H_2$ and $O_2$; As shown in FIG. 13 the cell voltage vs current density is essentially linear between 0.9 v at 50 mA/$CM^2$ and 0.4 v at 830 mA/$CM^2$. The cell produced at this rate for 8 hrs. The test was terminated due to time constraints; not due to cell stack failure.

FIG. 14 shows the results for the same cell operated with $H_2$ and air at a pressure of 25/30 psig at 95° C. The output is likewise essentially linear between 0.9 v at 10 mA/$CM^2$ to 0.4 v at 460 mA/$CM^2$.

For full scale stacks of 100 IFMT platelet cells of this invention operating on $H_2$—O2/air (depending on pressure) at 0.7 v and EMA current densities of 750 mA/$CM^2$, the power density would be 326 W/kg and specific power of 743. kW/$m^3$ (743 W/L).

These results are outstanding as compared to comparable graphite/NAFION $H_2/O_2$ and $H_2$/air cells, which produce in the range of 50 to 125 W/Kg. That is the IFMT platelet cells have power densities of about 3–6 times greater than current graphite fuel cells. This means the IFMT platelet $H_2$/air fuel cells of this invention can produce 6.79 kW in a cell stack weighing only 21.9 kg (46 lbs.), with a volume of but $0.009M^3$ (0.323 FT), that is 12.9" long×5.6" wide×7.6" high. This is powerful yet small enough for a hybrid mobile vehicle.

FIG. 15 is a flow sheet depicting the principal steps in the platelet manufacturing process involving feature formation by chemical milling (etching). The steps are as follows:

A. PLATELET STOCK INSPECTION

Incoming platelet stock 110 is subjected to inspection 120 to verify material type, rolled hardness, rolled thickness, surface uniformity, and relevant supplier information.

B PLATELET STOCK CLEANING AND DRYING

Platelet stock is cleaned 130 for photoresist application by degreasing using an automatic scrubbing machine. This process removes residual sheet stock rolling grease and oils. After degreasing the platelet is subjected to a mild chemical cleaning at room temperature by a dilute etching solution to remove oxides and surface impurities. For Ti the cleaning solution is 3%–9% HF and 10%–18% $HNO_3$. For other metals ferric chloride of 30–45 degree Baume' at room temperature is used as the cleaning solution. Platelets are dried in a forced convection dryer as the final step prior to application of photoresist.

Depending on whether the resist is wet or dry, the resist application proceeds by either Steps C-1 and C-2, or by C-3, below.

C-1. WET PROCESS PHOTORESIST APPLICATION

Wet process photoresist allows the finest resolution of details due to the thinness of the photoresist layer. Wet photoresist is typically applied, 135, using a dip tank. Small platelets may be spin coated using spin coating machines developed for the semiconductor industry.

C-2. RESIST OVEN:

Wet resist is baked (cured) in oven 137 to from a hard resilient layer.

C-3. DRY PROCESS PHOTO-RESIST APPLICATION

Dry photoresist is used where tolerances can be relaxed. For fuel cell separators dry resist is typically used. Dry resist is peeled off a backing sheet and bonded, 139, using a heated roller press. The roller press is similar to those used in the printed circuit industry. The rolling process automatically peels off the backing material from the photoresist. Typical dry photo-resist material is 2 mil "Riston4620" manufactured by the duPont Company.

D. PHOTO-RESIST MASK UV EXPOSURE

Platelets are exposed 140 using a UV contact exposure machine. Careful attention is paid to precise alignment of both sides of the artwork. Registration targets are used to aid this process.

E. IMAGE DEVELOPING

The exposed platelet is passed, 145, through a developing solution and oven. Wet process resist is developed in a hydrocarbon developer, which removes uncured resist. Typical developer is "Stoddard's Solution", part number GW 325, manufactured by Great Western Chemicals and Butyl Acetate, part number CAS 104-46-4, available from Van Waters and Rogers. Wet process development uses these solutions full strength at room temperature. After exposure to the developing agents the remaining wet resist is rebaked to form a resilient layer. Dry process developing uses duPont "Liquid Developer Concentrate", part number D-4000, in a 1.5% solution at 80° F.

F. SPRAY ETCH TANK CHEMICAL MACHINING

Developed platelets are etched 150 in a spray etch tank. Spray tanks are preferred to dip tank etchers due to the higher thoughput rates. In some cases finer resolution can be obtained with dip tank etchers than can be obtained from spray etcher. The etching process is very sensitive to the strength of the etchant solution, speed of the conveyer belt, spray pressure and process temperature. Process feedback 155 on these parameters is maintained during a production run by continuous in-process inspection 152. Line speed is typically varied to obtain the desired etch results. Either ferric chloride or HF/nitric acid solution is used as the etchant. Ferric chloride is used for copper, aluminum, and stainless steel. HF/nitric acid is used for titanium. For titanium typical etchant concentrations run from 3%–10% HF and 10 %–18% $HNO_3$. The range of etching temperatures for titanium are 80°–130° F. For other metals typical ferric chloride concentrations are 30°–45° Baume' with the etching temperature maintained in the range of 80°–130° F. The specific concentration and temperature conditions can be controlled for each different metal employed. Line speed is a function of the number of active etching tanks. Typical etchers are built up from individual etching tanks joined by a common conveyer. Typical etchers are available from Schmid Systems, Inc. of Maumee, Ohio and Atotech Chemcut of State College, Pa. Platelets are washed in a cascade washer after the last etch tank. The cascade washer removes excess etchant prior to inspection.

G. IN-PROCESS INSPECTION

Platelets are inspected at 152 to feed back etch rate and line speed information to the etching process. In-process inspection is typically performed visually.

H. STRIP RESIST

Wet process photo resist is stripped 160 using a hydrocarbon stripper at 200° F. A suitable one being "Chem Strip", part number PC 1882, manufactured by Alpha Metals of Carson, Calif. Dry process photo resist is stripped using a commercial strip solution such as "Ardrox", part number PC 4055, manufactured by Ardrox of La Mirada, Calif. Ardrox is diluted to 1–3% and used at 130° F. After stripping the platelets are cleaned using a cascade washer.

I. FINAL INSPECTION

Visual final inspection is performed 165 by measuring and comparing with the critical dimensions 162 selected during the CAD design process. This information is fed back to control the etching and design process.

The finalized mother sheets of platelets 172 are placed in inventory 170 being kept together by type or in groups. Note the roll stock is typically Ti of thickness 4–25 mils (depending on platelet design requirements) 36" wide and the platelet blanks are 6"×8", so that in the continuous feed process described above the platelets are arranged 6-up, that is, 6 across the width of the sheet. The platelets can be all of the same type, e.g. platelet #2 (30-2 of FIG. 4.) or in a grouped series, platelets 1–7 ( 30-1 to 30-7).

FIG. 16 is a process flowsheet depicting the presently preferred method of bonding the platelets into monolithic polar separator assemblies. The platelet mother sheets 172 are withdrawn from the inventory 170 as needed and processed as follows:

A. CHEMICAL CLEANING

Full strength etchant at room temperature is used to clean platelets, 175, to insure an oxide free surface for bonding. After cleaning the platelets are oven baked to dry them.

B. PLATELET SINGULATOR

Platelet mother sheets are singulated 180 by cutting the bridges holding the featured platelets in place in the mother sheet. This is done prior to stacking to facilitate the bonding process.

C. STACKING PROCESS and BOND STOP OFF SPRAY APPLICATION

Platelets are oriented horizontally ordered (placed in proper sequence), and vertically stacked in sequence 190 on hot platens having two alignment pins 182. The platelet alignment holes (holes 32 of FIG. 5) are placed over the pins to precisely align the platelets so that mating platelet features correlate to form the vias, lands, manifolds and channels.

Prior to stacking, the hot platens are coated 195 with commercially available bond stop-off to prevent the platelets from bonding to the platens. Bond stop-off composition varies according to the type of metal to be bonded. Yttrium oxide is used for titanium and aluminum oxide is used other metals. Bond stop-off is also applied between platelet stack assemblies to prevent bonding to adjacent stacks. Mini platens are placed between platelet stack assemblies to accurately transmit loads and facilitate bonding. In this manner up to 100 separators may be bonded at a time in a single bonding stack between a top and a bottom platen.

D. DIFFUSION BONDING

The assembled platelet stacks 190 (platen not shown) are loaded into a heated vacuum press for diffusion bonding 200. Different metals require different bonding conditions. Bonding conditions are determined by a specific schedule of applied ram pressure and temperature. To initiate the bonding cycle the press is closed and to evacuated to $10^{-6}$ torr to prevent oxidation during heating and degas the interstices between platelets. Once the appropriate vacuum is achieved, the furnace heat is turned on and the assembled platelet stacks are allowed to thermally equilibrate. In some cases partial ram pressure is applied during the heat up period. When thermal equilibrium is achieved bonding pressure is applied for a specified schedule that depends upon the metal being bonded. In some cases post-bond heat treatments are applied at reduced pressure depending upon the types of parts and types of metals being bonded. Typical bond cycles last 10 to 60 minutes at 900° F. to 1700° F. under pressures of 2000 psi to 4000 psi, depending upon the metal and platelet design to be bonded. Typical heat treatment for Ti ranges from about 1500° F. to about 1600° F. for about 60 min at 100 psi. The temperature is reduced to room temperature upon completion of the bonding and heat treatment cycles. When chamber temperature reaches 100° F. to 200° F. the vacuum is released and the vacuum press is unloaded.

E. PROOF AND/OR LEAK CHECK

Bonded platelet separators are leak checked, 205, using a test fixture to apply internal pressure to the channels, manifolds and vias to verify bond integrity, i.e., that there are no edge leaks or internal channel short circuits.

F. POST BOND CLEANING

After leak checking, bond stop off is cleaned 210 form the platelet separators using mechanical scrubbing followed by an acid etch, cascade washing and forced air oven drying.

G. FINAL TRIM

Processing aids, such as handling frames and platelet sequencing numbers (formed on the edges of the platelets) are removed (cut off) in the final trim operation 215 to produce the monolithic bonded platelet separator 220 having the intricate, internal microchannel fields described above.

H. PASSIVATING

Completed titanium separators are subjected to nitriding 225 in a vacuum furnace. Separators are loaded into a vacuum furnace which is evacuated to $10^{-6}$ torr. Dry nitrogen is introduced into the furnace to a pressure of 1 psig. This cycle is repeated. Once the final pressure of 1 psig is attained, the furnace is heated to between 1200° F. and 1625° F. for a period of from about 20 to about 90 minutes. The specific times and temperatures depend upon the thickness of the titanium nitride coating desired. The furnace is cooled, repressured and the finished product nitrided (passivated) platelet separator 230 is ready for assembly with EMAs to form individual cells, and a plurality of cells to form a full cell stack which is held together with tie rods (passing through holes 34 in FIG. 5) and secured with nuts to place the stack under compression so it does not leak under applied gases pressures. Operating a cell of this manufacture is described above in conjunction with FIGS. 11–14.

FIG. 17 depicts the process of preparing the platelet design artwork for the photolithography wet or dry process etching of platelets described above in FIGS. 15 and 16. The steps are as follows:

A. PLATELET DRAWINGS

Platelet assembly drawings are developed on computer automated drawing CAD systems 240. The drawings are dimensioned in net dimensions. Both sides of each platelet are finalized as plan views 245. These drawings are electronically transmitted to the platelet mask artwork generation CAD system 250. From the CAD drawings an inspection database 162 is generated. This inspection database consists of critical dimensions that need to be verified during the artwork creation and manufacturing processes. Both artwork and platelets are inspected during the manufacturing process.

B. MASK ARTWORK GENERATION

Platelet CAD drawings are converted in the mask artwork CAD system 250 to photo tooling masks for each platelet. Etch factors are applied to each feature in each drawing. Etch factors adjust the width of the phototooling mask to the width of the features to compensate for undercutting that occurs during the chemical etching processes used to mill individual platelets. This entails reducing channel dimensions in the photo tooling mask to compensate for undercutting. Etch factors depend upon the type of metal, type of chemical milling equipment, etch speed, type and strength of the etchant used. Fabrication aids are added during the mask generation process. Fabrication aids include registration targets, platelet numbers and handling frames to aid in the stacking and bonding process.

C. ARTWORK PHOTOPLOTTING

Platelet art work is plotted at a 1 times magnification on a film using an automatic photoplotter 255.

D. POSITIVE INSPECTION

Video inspection of the finished artwork is performed, 260, using the inspection database 162 generated during the Platelet CAD drawing process. After inspection the top (front) and bottom (back) platelet artworks are joined, 270, in precise registration.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. An integrated fluid management microchannel architecture monolithic polar fuel cell separator for a PEM fuel cell, comprising in operative combination:
    (a) a plurality of platelets of thin metallic sheet material;
    (b) each platelet having features formed therein prior to assembly into a separator, said features being selected from at least one of through-formed or depth-formed tabs, metering orifices, mixing chambers, lands, microchannels, vias to convey fluids from one platelet to another, close outs, and manifolds;
    (c) said features are interrelated and coordinate from platelet to platelet to provide in combination in an assembled separator:
        i) at least one active area continuous micro-channel field in communication with at least one inlet via and one outlet via;
        ii) at least one microchannel aqueous humidification field; and
        iii) at least one micro-channel liquid coolant field;
    (d) said platelets containing said lands, micro-channels and tabs upon bonding together forming micro-channel field structures of closely spaced, narrow microchannels and substantially equal width lands, adjacent lands being held in configurational position by depth-formed tabs in at least one platelet, which tabs bridge across said channels to adjacent lands but do not obstruct flow of gaseous or liquid reactant through said micro-channels;
    (e) said humidification and said coolant fields being integrated within said separator in substantially the same plane as an active field, or in a plane substantially parallel thereto, to provide integrated fluid and thermal management flow circuits; and
    (f) upon assembly to form said separator said platelets are bonded together without glue along mating surfaces in the area of said fields to form a monolithic separator, said monolithic separator having internal microchannel architecture features therein defining integrated fluid and thermal management flow circuits, said separator, upon use in contact with at least one electrode membrane assembly in a fuel cell stack, providing substantially higher power density than said solid graphite fuel cells.

2. A polar fuel cell separator as in claim 1 wherein, in assembly with an electrode membrane, said humidification field of an anode or cathode side of a first separator assembly is in cross-membrane humidification communication with a reactant humidifying field of a corresponding cathode or anode side of an adjacent separator by heated coolant liquid vapors passing through said membrane in the area of said humidification field.

3. A polar fuel cell separator as in claim 2 which includes:
    (a) at least one coolant field in a plane substantially parallel to said active field.

4. A polar fuel cell separator as in claim 3 wherein:
    (a) said coolant field is upstream of and communicates with at least one of said humidification fields to provide heated humidification liquid to said humidification field.

5. A polar fuel cell separator as in claim 1 wherein said features are formed by a combination of depth etching and through etching.

6. A polar fuel cell separator as in claim 5 wherein said platelets are diffusion bonded under heat and pressure to form said monolithic separator.

7. A polar fuel cell separator as in claim 6 wherein:
    (a) said separator is bipolar separator comprising an anode side and a cathode side, and active field channels are tailored in length, micro-channel cross section dimension, and serpentine configuration to the gas composition and viscosity.

8. A polar fuel cell separator as in claim 6 wherein:
    a) said separator fields include an $H_2$ humidification field, and an $Air/O_2$ humidification field.

9. A fuel cell stack comprising in operative combination:
    a) a plurality of cells comprising:
        i) bipolar separators and membrane electrode assemblies in a stacked array;
        ii) an anode separator end plate at one end of said stack in contact with one of said membrane electrode assemblies;
        iii) a cathode separator end plate at a second end of said stack in contact with a membrane electrode assembly;
    b) said bipolar separator, and said anode and cathode separators are separators as in claim 1; and
    c) said cells are assembled in sequence under compression to form an operating cell.

10. A fuel cell stack as in claim 9 wherein:
    a) said features include at least one humidification field for a fuel or an oxidant, and at least one coolant field in communication with said humidification field to provide heated fluid to said humidification field.

11. A fuel cell stack as in claim 10 wherein said fields are tailored in length, micro-channel cross-section dimension and serpentine configuration for $H_2$ as fuel and $Air/O_2$ as an oxidant.

12. A fuel cell stack as in claim 11 wherein:
    (a) said separators are formed of diffusion bonded metal selected from Ti, Al, Cu, W, Niobium, stainless steel, alloys and laminates thereon.

13. A fuel cell stack as in claim 12 wherein:
    a) said membrane electrode assembly is selected from a carbon paper coated PEM and a carbon paperless PEM, and
    b) said separators include a window frame platelet in contact with said carbon paper coated PEM or a window screen platelet in contact with said carbon paperless PEM.

14. A polar fuel cell separator as in claim 1 wherein at least one of said continuous micro-channel fields includes at least one platelet with at least one channel laid out in a sinusoidal configuration.

15. A polar fuel cell separator as in claim 14 wherein in at least one platelet, at least a portion of said channels are through formed, and said bridging tab is depth formed in said platelet.

16. A polar fuel cell separator assembly as in claim 15 wherein said humidification field is substantially coplanar with said reactant flow field.

17. A fuel cell stack as in claim 10 wherein, in assembly with an electrode membrane, said humidification field of an anode or cathode side of a first separator assembly is in cross-membrane humidification communication with a reactant gas humidifying field of a cathode or anode side of an adjacent separator.

18. A polar fuel cell stack as in claim 17 wherein said humidification field is in communication with a coolant field to provide heated humidification fluid to said humidification field.

19. A polar fuel cell separator assembly as in claim 1 wherein said reactant gas humidifying field is disposed upstream of the electrode membrane active field for said reactant, and said coolant field is upstream of said humidification field to provide for countercurrent cross-membrane humidifying of said reactant gas with heated coolant fluid vapors passing through said membrane.

20. A fuel cell stack as in claim 10 wherein said reactant gas humidifying field is disposed upstream of the electrode membrane active field for said reactant, and said coolant field is upstream of said humidification field to provide for countercurrent cross-membrane humidifying of said reactant gas with heated coolant fluid vapors passing through said membrane.

* * * * *